US011860878B2

(12) United States Patent
Yamamura et al.

(10) Patent No.: US 11,860,878 B2
(45) Date of Patent: Jan. 2, 2024

(54) INQUIRY SYSTEM AND RELAY DEVICE

(71) Applicant: FANUC CORPORATION, Yamanashi (JP)

(72) Inventors: Masato Yamamura, Yamanashi (JP); Hitoshi Hirota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/937,037

(22) Filed: Jul. 23, 2020

(65) Prior Publication Data
US 2021/0056111 A1 Feb. 25, 2021

(30) Foreign Application Priority Data

Aug. 21, 2019 (JP) .................................. 2019-151255
Dec. 20, 2019 (JP) .................................. 2019-230579

(51) Int. Cl.
G06F 17/00 (2019.01)
G06F 16/2457 (2019.01)
G06F 16/248 (2019.01)

(52) U.S. Cl.
CPC ...... G06F 16/24575 (2019.01); G06F 16/248 (2019.01)

(58) Field of Classification Search
CPC .. G06F 16/24575; G06F 16/248; G06Q 10/20
See application file for complete search history.

(56) References Cited

U.S. PATENT DOCUMENTS

2012/0150777 A1* 6/2012 Setoguchi ........... G06F 16/2453
706/14
2012/0253870 A1* 10/2012 Tsuru ..................... G07C 5/008
705/7.12
(Continued)

FOREIGN PATENT DOCUMENTS

CN 104217338 12/2014
CN 106485460 3/2017
(Continued)

OTHER PUBLICATIONS

Xi Luan, Jianjun Wu, Chengzhe Piao, Yuxin Cheng and Haige Xiang, "Cooperative transmission based on multi-relay Device-to-Device communications in cellular networks," 11th International Conference on Wireless Communications, Networking and Mobile Computing (WiCOM 2015), pp. 1-5, Sep. 2015.*
(Continued)

Primary Examiner — Greta L Robinson
(74) Attorney, Agent, or Firm — Wenderoth, Lind & Ponack, L.L.P.

(57) ABSTRACT

An inquiry system is provided in which an inquiry unit of a user of a machine and/or a device makes inquiries related to the machine and/or the device to inquiry a plurality of center systems of suppliers, and includes: a relay device which connects the inquiry unit and the inquiry center systems; and a storage unit which stores first and second identification information related to the machine and/or the device, the inquiry unit includes: an acquisition unit which acquires the first identification information; and a first communication unit which transmits the first identification information acquired to the relay device, the relay device includes: a second communication unit which communicates between the inquiry unit and the inquiry center systems; and a selection unit which selects, based on the first and second (Continued)

identification information, the inquiry center system and the second communication unit connects the inquiry unit and the inquiry center system.

33 Claims, 12 Drawing Sheets

(56) References Cited

U.S. PATENT DOCUMENTS

| | | | | |
|---|---|---|---|---|
| 2013/0212160 | A1* | 8/2013 | Lawson | G06F 16/9535 |
| | | | | 709/203 |
| 2015/0177219 | A1* | 6/2015 | Ohnuma | G01N 21/251 |
| | | | | 356/70 |
| 2017/0041468 | A1* | 2/2017 | Yokoyama | H04M 3/567 |
| 2017/0228739 | A1 | 8/2017 | Massaroni et al. | |
| 2017/0343946 | A1* | 11/2017 | Bury | G06Q 10/20 |
| 2018/0038773 | A1 | 2/2018 | Matsuo et al. | |
| 2018/0276623 | A1 | 9/2018 | Pausch et al. | |
| 2018/0307891 | A1* | 10/2018 | Hayashi | G06Q 30/06 |
| 2019/0052347 | A1* | 2/2019 | Otake | H04W 76/15 |
| 2019/0339678 | A1* | 11/2019 | Biernat | G05B 19/41865 |
| 2019/0347698 | A1* | 11/2019 | Oda | G06Q 30/0278 |

FOREIGN PATENT DOCUMENTS

| | | |
|---|---|---|
| DE | 102013208123 | 11/2014 |
| JP | 2017-174137 | 9/2017 |
| JP | 2018-005832 | 1/2018 |

OTHER PUBLICATIONS

Kenneth Holmberg et al., "E-maintenance", Aug. 19, 2010, Springer, XP055385791, ISBN: 978-1-84996-204-9, pp. ToC, Ch01-Ch04.

Kenneth Holmberg et al., "E-maintenance", Aug. 19, 2010, Springer, XP055837064, ISBN: 978-1-84996-204-9, p. Ch09.

Communication pursuant to Article 94(3) EPC dated Sep. 8, 2021 in corresponding European Patent Application No. 20190041.2.

Wikipedia: "Object hyperlinking", Internet Article, Apr. 27, 2019 (Apr. 27, 2019), XP055735392, Retrieved from the Internet: URL:https://en.wikipedia.org/w/index.php?title=Object_hyperlinking&oldid=894309427, retrieved on Sep. 30, 2020, pp. 1-4.

Norbert Bartneck et al: "Optimizing Processes With RFID and Auto ID—Fundamentals, Problems and Solutions, Example Applications", Apr. 20, 2009 (Apr. 20, 2009), Publicis Publishing, XP055641946, ISBN: 978-3-89578-330-2, pages ToC, Ch02-Ch06, Ch09-Ch12, Ch16, Ind, * chapter 3 *.

Harvey Lehpamer: "RFID Design Principles", Dec. 31, 2007 (Dec. 31, 2007), Artech House, XP055219663, ISBN: 978-1-59693-194-7, chapter 3, pp. 178, 261-262.

Oliver Drobnik: "Barcodes With iOS: Bringing together the digital and physical worlds", Feb. 19, 2015 (Feb. 19, 2015), Manning Publications, XP055331473, pp.s ToC, Ch01, Ch06-Ch07, Ind, * chapters 1 and 7 *.

Extended European Search Report dated Oct. 16, 2020 in European Patent Application No. EP20190041.2.

* cited by examiner

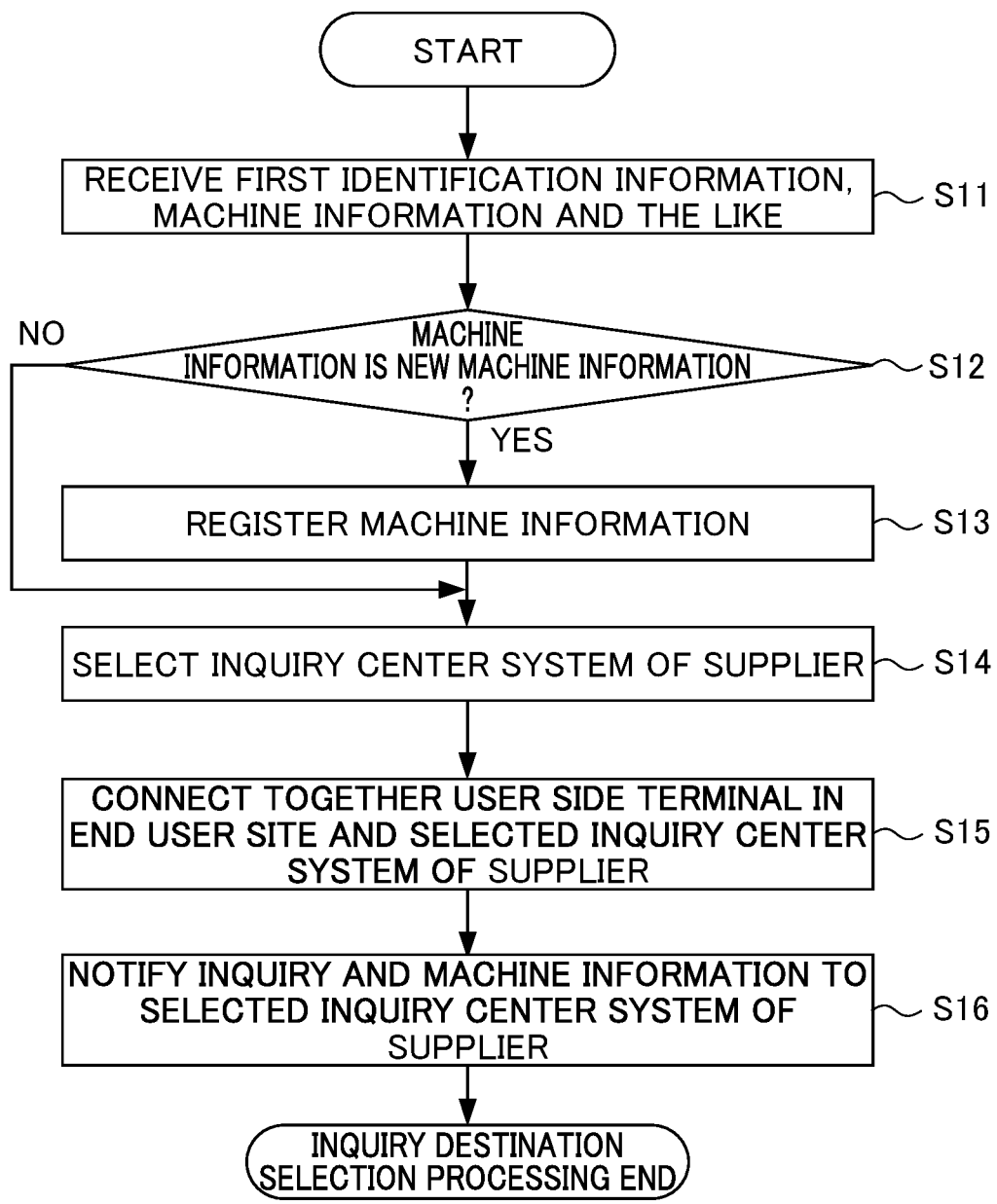

INQUIRY SYSTEM AND RELAY DEVICE

This application is based on and claims the benefit of priority from Japanese Patent Application No. 2019-151255, filed on 21 Aug. 2019, and Japanese Patent Application No. 2019-230579, filed on 20 Dec. 2019, the contents of which are incorporated herein by reference.

BACKGROUND OF THE INVENTION

Field of the Invention

The present invention relates to an inquiry system and a relay device.

Related Art

Conventionally, in a factory or the like in which a machine tool and an industrial robot are operated, a mechanism is established that performs failure monitoring in order to achieve a continuous stable operation. Then, in general, when a failure occurs, an operator in the factory or the like identifies a machine in which the failure occurs, and depending on the details of the failure, for example, the operator directly makes an inquiry to the call center of the maker of the machine such as by telephone, mail or homepage.

The call center of the maker registers, as an incident, the details of the received inquiry in a database provided in the call center of the maker so as to perform the management of incidents.

In this point, a technology is known in which in a method of supporting the inputting of incident cases having a plurality of items in operation management, an input of a specific item included in a plurality of items is received, and in which an incident case corresponding to the received input is searched for in an extended range corresponding to the specific item. See, for example, Patent Document 1.

A machine tool and an industrial robot in an end user site such as a factory are often formed with the products of a plurality of makers. A plurality of makers (hereinafter also referred to as "suppliers") include a wide variety of a machine maker, a controller maker, a cutting tool maker, an automation system maker, an integrator, a machine tool sales company, a cutting tool sales company, auxiliary machine makers and the like. Hence, in order to select, from the call centers (hereinafter also referred to as "inquiry center systems") of a plurality of suppliers, an inquiry center system which can provide an appropriate answer, it is necessary for the user in the end user site to have advanced expertise. However, it is difficult for all users in the end user site to have advanced expertise.

Hence, in the end user site, for example, the user makes inquiries to the inquiry center systems of the individual suppliers so as to be passed from one inquiry center system to another until reaching an appropriate answer. For example, when the user in the end user site first makes an inquiry to a machine tool sales company about a cutting failure, the user is instructed to make an inquiry to a machine maker. Since the user in the end user site makes an inquiry to the machine maker but the cutting failure is not solved, the user in the end user site makes an inquiry to the machine tool sales company again, and is instructed to make an inquiry to a controller maker. Then, when the user in the end user site makes an inquiry to the controller maker, the user in the end user site is introduced to a tool maker, and thus the cutting failure is solved.

In this case, in the end user site, the same inquiry needs to be made for each of the inquiry center systems of the suppliers, and thus this is complicated, and it takes much time until the cutting failure is solved. However, there is no way for the end user site to grasp the situations of the inquiry center systems of the individual suppliers.

Patent Document 1: Japanese Unexamined Patent Application, Publication No. 2017-174137

SUMMARY OF THE INVENTION

Hence, it is desired to be able to select an inquiry center system which can provide an appropriate answer even when a user in an end user site does not have advanced expertise.

(1) An inquiry system according to one aspect of the present disclosure is an inquiry system in which an inquiry unit that is a terminal device of a user of a machine and/or a device makes inquiries related to the machine and/or the device to inquiry a plurality of center systems of suppliers including a maker of the machine and/or the device, and includes: a relay device which connects together the inquiry unit and the inquiry center systems; and a storage unit which stores first identification information related to the machine and/or the device and second identification information related to the machine and/or the device, the inquiry unit includes: an acquisition unit which acquires the first identification information related to the machine and/or the device; and a first communication unit which transmits the first identification information acquired by the acquisition unit to the relay device, the relay device includes: a second communication unit which communicates between the inquiry unit and the inquiry center systems; and a selection unit which selects, based on the first identification information and the second identification information, the inquiry center system and the second communication unit connects together the inquiry unit and the inquiry center system selected by the selection unit.

(2) A relay device according to one aspect of the present disclosure is a relay device which relays inquiries related to a machine and/or a device made by an inquiry unit that is a terminal device of a user of the machine and/or the device to inquiry a plurality of center systems of suppliers including a maker of the machine and/or the device, and includes: a communication unit which communicates between the inquiry unit and the inquiry center systems; and a selection unit which selects the inquiry center system based on first identification information related to the machine and/or the device and second identification information related to the machine and/or the device that are stored in a storage unit and the communication unit connects together the inquiry unit and the inquiry center system selected by the selection unit.

According to the one aspect, it is possible to select an inquiry center system which can provide an appropriate answer even when a user in an end user site does not have advanced expertise.

BRIEF DESCRIPTION OF THE DRAWINGS

FIG. 5 is a flowchart illustrating the relay processing of the relay device according to the first embodiment;

DETAILED DESCRIPTION OF THE INVENTION

First Embodiment

An outline of the present embodiment will first be described. The present embodiment relates to a relay device which relays inquiries related to a machine and/or a device made by an inquiry unit that is a terminal device of a user of the machine and/or the device to the inquiry a plurality of center systems of suppliers including the maker of the machine and/or the device. An end user site is, for example, a factory in which a machine and a device such as a machine tool and an industrial robot are operated. The inquiry center systems of the suppliers may include not only the manufacturers of the machine and the device but also a controller maker, a cutting tool maker, an automation system maker, an integrator, a machine tool sales company, a cutting tool sales company, auxiliary machine makers and the like. The relay device receives, from the terminal device in the end user site, first identification information which includes at least individual identification information related to the machine and/or the device. Then, the relay device selects, based on the individual identification information serving as the first identification information, an inquiry history serving as second identification information and the like, the inquiry center system of the supplier, and connects together the terminal device in the end user site and the terminal device of the inquiry center system of the supplier which is selected.

In this way, in the present embodiment, it is possible to select the inquiry center system which provides an appropriate answer even when the user in the end user site does not have advanced expertise.

The outline of the present embodiment has been described above.

<Inquiry System 100>

The configuration of the present embodiment will then be described in detail with reference to drawings.

Figure 1:
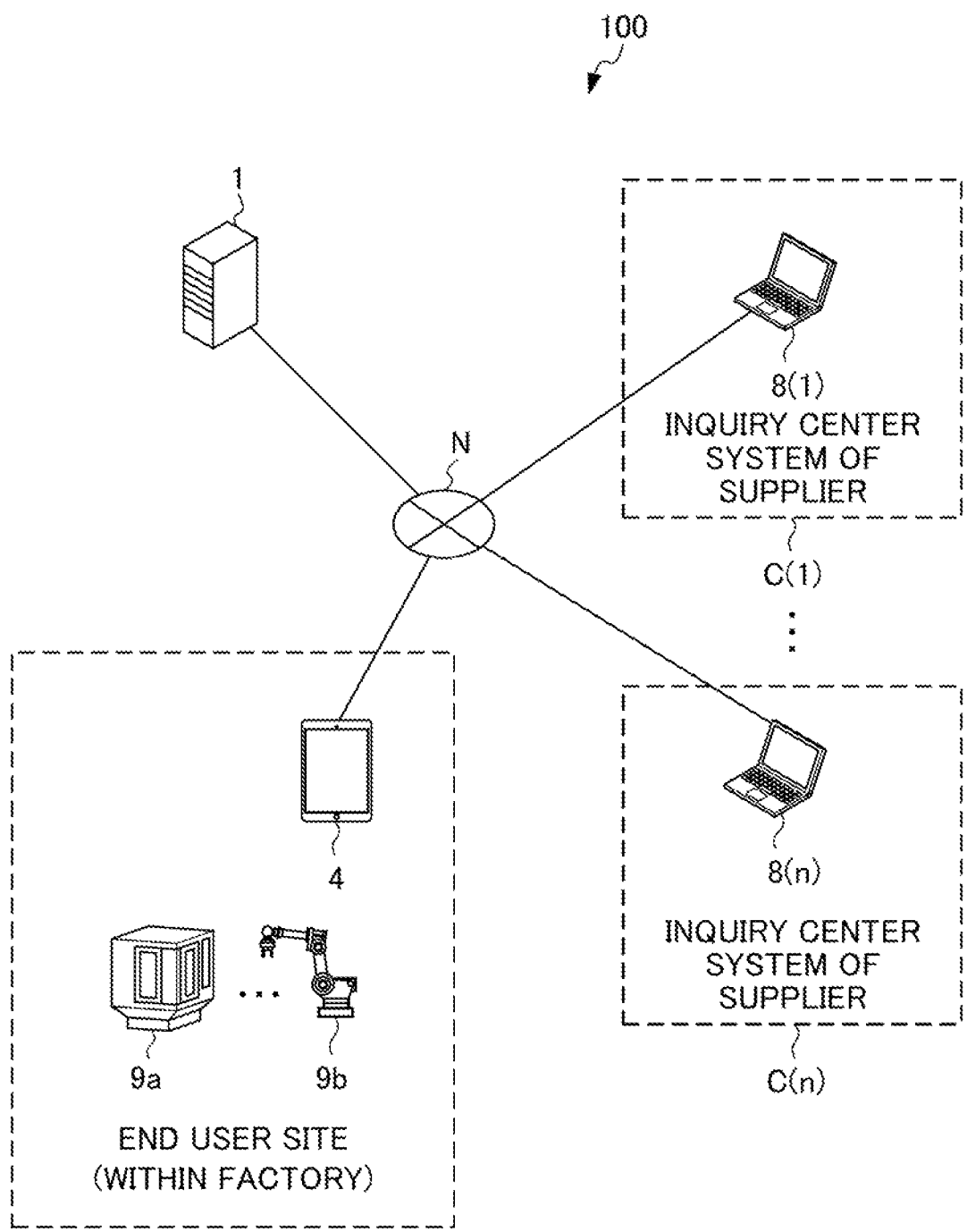
FIG. 1 is a diagram showing an example of the configuration of an inquiry system according to a first embodiment.

FIG. 1 is a diagram showing an example of the configuration of an inquiry system 100 according to the present embodiment. As shown in FIG. 1, the inquiry system 100 includes: a relay device 1; a user side terminal 4 which serves as an inquiry unit and which is a terminal device in an end user site; and terminal devices 8(1)-8(n)), which are connected to inquiry center systems C(1) to C(n) of suppliers (n is an integer of 2 or more).

The relay device 1, the user side terminal 4 and the terminal devices 8(1)-8(n)) can communicate with each other through, for example, a communication network N. The communication network N is, for example, the Internet, a VPN (Virtual Private Network), a public telephone network or the like. A specific communication method in the communication network N, which one of wired connection and wireless connection is used and the like are not particularly limited.

Although FIG. 1 shows only one end user site, user side terminals 4 in a plurality of end user sites may be connected to the relay device 1. Although in each of the end user site and the inquiry center systems C(1) to C(n) of the suppliers, one user side terminal 4 or one terminal device 8 is (e.g., 8(1)-8(n)) is indicated, each may include a plurality of terminal devices, and the terminal devices may be connected to the relay device 1.

Although in FIG. 1, a machine tool 9a and an industrial robot 9b are illustrated in the end user site, they are examples of the machine and the device.

The inquiry center systems C(1) to C(n) of the suppliers may be inquiry center systems of different sections in the same company or inquiry center systems of different companies. For example, the inquiry center system C(1) of the supplier may be an inquiry center system of support staff in a machine maker, and the inquiry center system C(2) of the supplier may be an inquiry center system of experts in the same machine maker.

When in the following description, the inquiry center systems C(1) to C(n) of the suppliers do not need to be distinguished from each other, they are also collectively referred to as the "inquiry center systems C of the suppliers".

<Relay Device 1>

Figure 2:
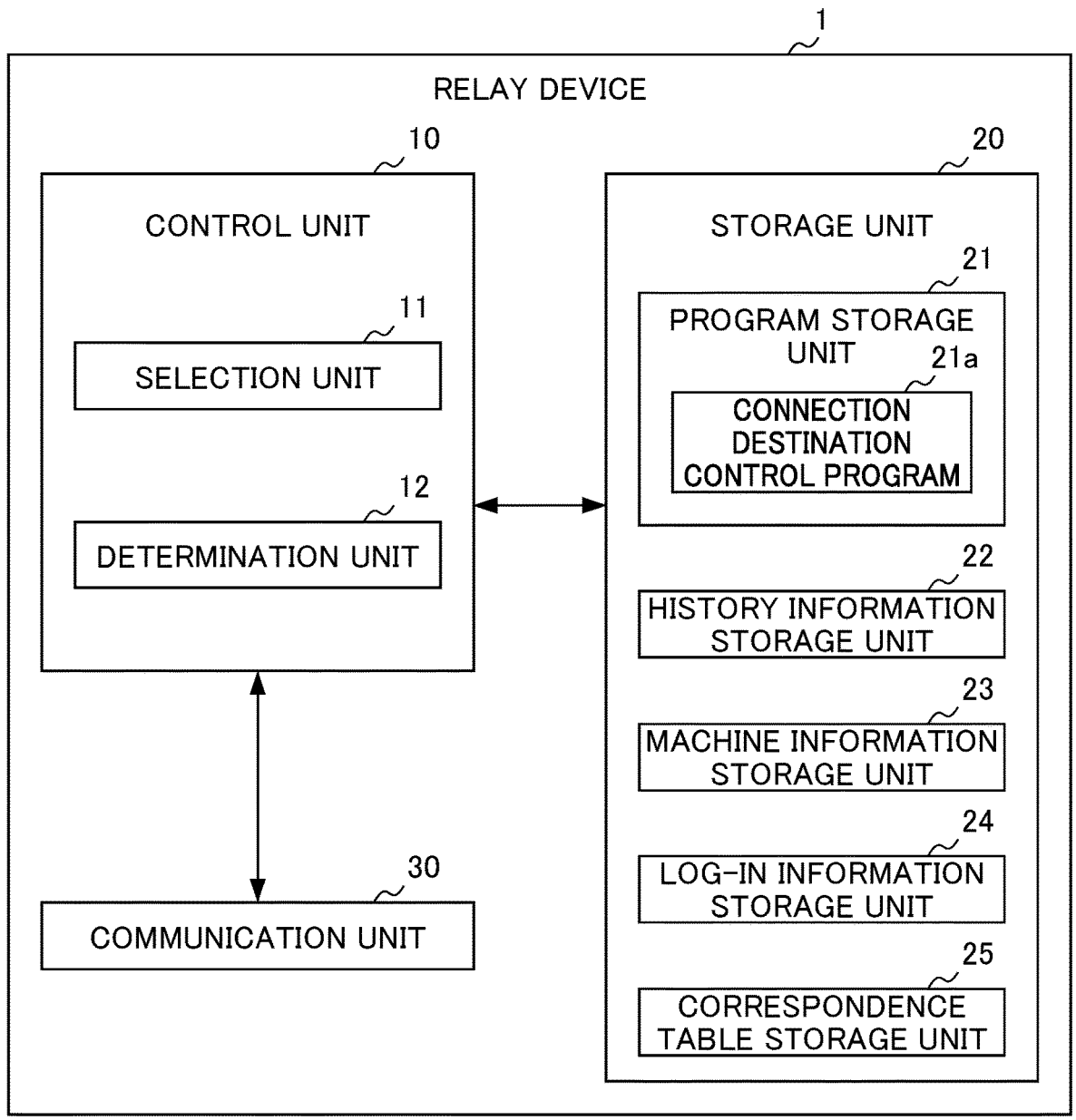
FIG. 2 is a functional block diagram showing an example of the functional configuration of a relay device according to the first embodiment.

FIG. 2 is a functional block diagram showing an example of the functional configuration of the relay device according to the present embodiment.

The relay device 1 is, for example, a dedicated server, a web server or the like, and includes a control unit 10, a storage unit 20 and a communication unit 30.

The control unit 10 is a CPU (Central Processing Unit) or the like, and executes various types of programs which are stored in the program storage unit 21 of the storage unit 20 and which control the relay device 1 so as to perform centralized control on the relay device 1.

The control unit 10 includes a selection unit 11 and a determination unit 12. These functional units are realized by the execution of a connection destination control program 21a stored in the program storage unit 21 with the control unit 10.

The selection unit 11 selects the inquiry center system C based on the first identification information of the machine and/or the device and the second identification information of the machine and/or the device.

The first identification information includes, for example, any one of the individual identification information of the machine and/or the device, the model information of the machine and/or the device and the individual identification information of the two-dimensional code of the machine and/or the device.

The second identification information includes, for example, any one of the inquiry history, the repair history of the machine and/or the device, the installation site of the machine and/or the device, the part information of the machine and/or the device, the version (version number)

information of software of the machine and/or the device, the setting information of the machine and/or the device, alarm information generated in the machine and/or the device, the user information of the machine and/or the device, the manufacturer information of the machine and/or the device, and the sales maker information of the machine and/or the device.

For example, the selection unit 11 selects an inquiry center system C(k) of a supplier based on the individual identification information that is received from the user side terminal 4 in the end user site and that is attached to the machine tool 9*a* or the industrial robot 9*b* and information stored on the database of a history information storage unit 22, a machine information storage unit 23 and the like in the storage unit 20 which will be described later. Here, k is an integer of any one of 1 to n.

The selection unit 11 may select the inquiry center system C of the supplier based on information on the database associated with the individual identification information. Alternatively, the selection unit 11 may recommend the inquiry center systems C of a plurality of suppliers based on the information on the database associated with the individual identification information such that the user side terminal 4 makes a selection.

More specifically, the selection unit 11 determines, based on information such as the inquiry history which is stored on the database of the history information storage unit 22, the machine information storage unit 23 and the like in the storage unit 20 and which is associated with the individual identification information of the machine and the device in the end user site, a new inquiry when the inquiry history or the like corresponding to the individual identification information is not present. In this case, the selection unit 11 may select the inquiry center system C of the supplier which is frequently selected in the inquiry history of the machine and/or the device on the individual identification information. Alternatively, the selection unit 11 may select (recommend) the inquiry center system C of the supplier corresponding to the machine and/or the device installed in the end user site based on a correspondence table stored in a correspondence table storage unit 25 which will be described later.

When the selection unit 11 detects, based on the received individual identification information and the history information of inquiries or the like, for example, that an inquiry was made to the inquiry center system C(k) of the supplier about a tool fitted to the machine tool 9*a* two days ago, the selection unit 11 determines that the inquiry is being continued. In this case, the selection unit 11 may select the same inquiry center system C of the supplier as last time.

Then, the communication unit 30 which will be described later connects together the user side terminal 4 in the end user site and the inquiry center system C(k) of the supplier which is selected.

The determination unit 12 determines whether or not machine information needs to be stored in the storage unit 20.

For example, when the machine information of the machine and/or the device is received from the user side terminal 4, the determination unit 12 determines whether or not the machine information needs to be stored in the machine information storage unit 23 which will be described later.

More specifically, when the received machine information has already been stored in the machine information storage unit 23, the determination unit 12 determines that the received machine information is not new machine information for the individual identification information, and thereby does not store the received machine information in the machine information storage unit 23 so as to prevent a duplicate registration.

On the other hand, when the received machine information is not stored in the machine information storage unit 23, the determination unit 12 determines that the received machine information is new machine information for the individual identification information, and thereby stores the received machine information in the machine information storage unit 23.

The machine information includes information on hardware such as the type of board which is inserted into a slot of the machine and/or the device in the end user site and the type of tool. The machine information includes versions of software (firmware) such as a CNC (Computerized Numerical Control) and a PLC (Programmable Logic Controller). The machine information may be included in the second identification information described previously.

The determination unit 12 may notify, through the communication unit 30, the machine information received from the user side terminal 4 to the inquiry center system C of the supplier which is selected. Alternatively, the determination unit 12 may notify, through the communication unit 30, the machine information which is received from the user side terminal 4 and which is determined by the determination unit 12 to need to be stored to the inquiry center system C of the supplier which is selected. In other words, the notification of the machine information to the inquiry center system C may be performed based on whether or not the machine information is registered in the machine information storage unit 23 or may be performed regardless of whether or not the machine information is registered therein.

The storage unit 20 stores the first identification information related to the machine and/or the device and the second identification information related to the machine and/or the device.

For example, the storage unit 20 includes a storage region which stores programs that are executed with the control unit 10 and the like. The storage unit 20 also includes the program storage unit 21, the history information storage unit 22, the machine information storage unit 23, a log-in information storage unit 24 and the correspondence table storage unit 25.

The program storage unit 21 stores various types of programs which are executed with the control unit 10 of the relay device 1. The program storage unit 21 stores the connection destination control program 21*a* which executes various types of functions of the control unit 10 described above.

The history information storage unit 22 is a storage region which stores, for each of the machine and the device or each piece of individual identification information, the history information such as the inquiry history of inquiries and answers to the inquiries, the alarm information generated in the machine and/or the device and the repair history of the machine and/or the device.

The machine information storage unit 23 is a storage region which stores the machine information. The machine information storage unit 23 stores the machine information so as to associate the machine information with, for example, each of the machine and the device or each piece of individual identification information.

The machine information storage unit 23 may store the model information of the machine and/or the device or the individual identification information of the two-dimensional code of the machine and/or the device.

The machine information storage unit 23 may also store the installation site of the machine and/or the device, the part information of the machine and/or the device, the version (version number) information of software of the machine and/or the device and the setting information of the machine and/or the device.

The log-in information storage unit 24 stores: the user information which is information on the user in the end user site who utilizes the inquiry system 100, a person in charge of the inquiry center system C of the supplier and the like; log-in information for logging in to the inquiry system 100; and the like.

The correspondence table storage unit 25 stores the correspondence table (not shown) in which the inquiry center systems C of one or more suppliers (for example, the name of the supplier and contact information) are preset so as to correspond to the machines and the like (for example, a controller, various types of machine tools, a robot, a PLC and a laser oscillator) installed in each of the end user sites.

The unillustrated correspondence table may include information which indicates whether or not each of the inquiry center systems C of the suppliers logs in to the relay device 1. The selection unit 11 may reference the unillustrated correspondence table so as to select the inquiry center system C(k) of the supplier from among the inquiry center systems C of the suppliers which log in.

Although in the inquiry system 100 according to the present embodiment, the case has been illustrated where the relay device 1 includes the storage unit (for example, the history information storage unit 22 and the machine information storage unit 23) storing the first identification information related to the machine and/or the device and the second identification information related to the machine and/or the device, there is no limitation to this configuration. The storage unit which stores the first identification information related to the machine and/or the device and the second identification information related to the machine and/or the device may be configured as a system that the relay device 1 can access. Specifically, the storage unit may be provided as one or more file servers which are connected to the relay device 1 so as to be able to communicate therewith. In this case, the storage unit may be installed near the inquiry center system C. The storage unit may be provided, in a distributed manner, in the machine tool 9a and the industrial robot 9b serving as the machine and/or the device, the relay device 1, the user side terminal 4 which serves as the inquiry unit and which is the terminal device in the end user site and the inquiry center systems C(1) to C(n) of the suppliers serving as the inquiry center systems or may be provided in any one of them in a concentrated manner.

The communication unit 30 is a communication control device which transmits and receives data to and from external devices (for example, the user side terminal 4 and the terminal devices 8(1)-8(n)).

<User Side Terminal 4>

The user side terminal 4 is a portable terminal such as a smartphone or a tablet or a wearable device such as smart glasses which is carried by the user within the factory in the end user site or the like.

Figure 3:
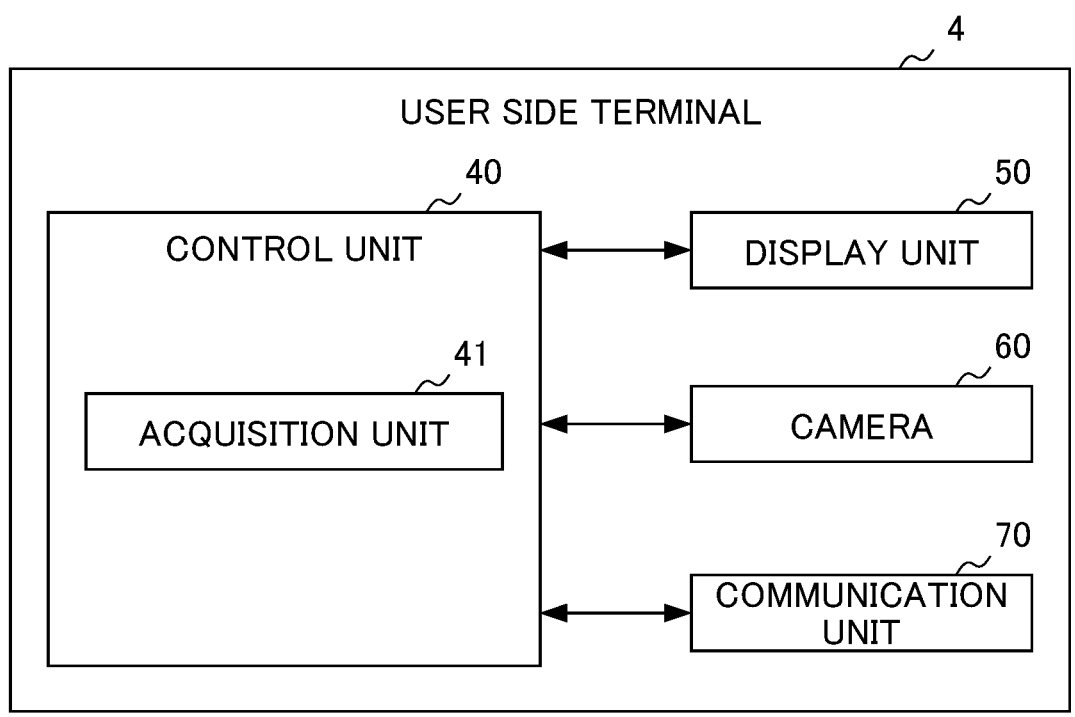
FIG. 3 is a functional block diagram showing an example of the functional configuration of a user side terminal in the first embodiment.

FIG. 3 is a functional block diagram showing an example of the functional configuration of the user side terminal in the present embodiment.

As shown in FIG. 3, the user side terminal 4 includes a control unit 40, a display unit 50, a camera 60 and a communication unit 70.

The control unit 40 is a CPU or the like, and executes various types of programs (not shown) stored in a storage unit (not shown) included in the user side terminal 4 so as to perform centralized control on the user side terminal 4.

The control unit 40 includes an acquisition unit 41.

The acquisition unit 41 acquires the first identification information related to the machine and/or the device.

Figure 4A:
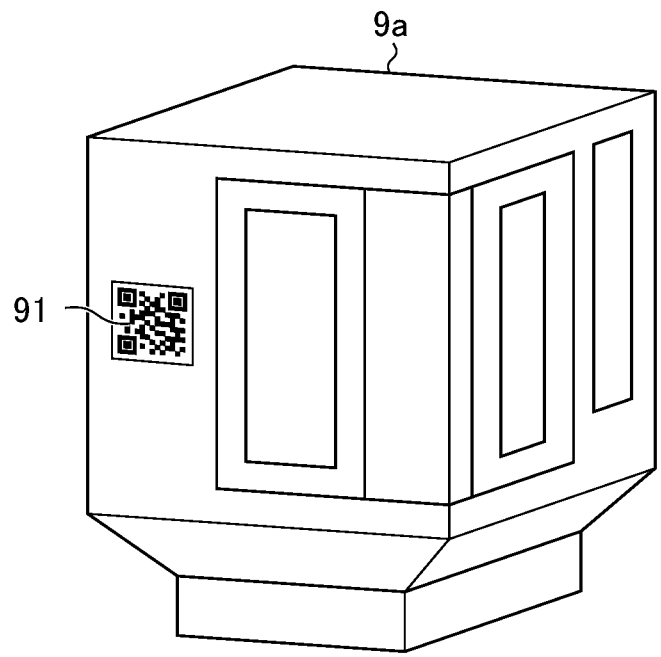
FIG. 4A is a diagram showing an example of attachment of a QR code in the first embodiment.

Specifically, for example, as shown in FIG. 4A, the acquisition unit 41 may read, through the camera 60, a QR code (registered trademark) provided to the machine tool 9a or the industrial robot 9b so as to acquire information (also referred to as "entity information") such as a URL (Uniform Resource Locator) for accessing the relay device 1, the individual identification information, a manufacturing number, the machine information and the identification information (for example, a telephone number) of the user side terminal 4.

Specifically, a configuration may be adopted in which the QR code is made to have, for example, the information (entity information) such as the URL, the individual identification information, the machine information and the identification information (for example, the telephone number) of the user side terminal 4, and in which thus acquisition unit 41 reads the QR code so as to be able to directly acquire these pieces of information.

The QR code may be prevented from having the entity information as described above, and may have, for example, a code (referred to as an "identification code") such as a number which does not have a meaning, which is sufficiently redundant and which is different from the manufacturing number (which includes a character string (which is long)). Here, the identification code may be previously and separately set in an entity information table (not shown) so as to uniquely correspond to the entity information such as the URL, the individual identification information, the manufacturing number, the machine information and the identification information of the user side terminal 4. In this way, for example, (1) even after the provision of the QR code, the QR code can be associated with the manufacturing number, and (2) it is possible to obtain an advantage in which the identification code to be printed is set sufficiently redundant for a shipped quantity so as to prevent forgery. The entity information table may be stored in the above-described storage unit (which stores the first identification information related to the machine and/or the device and the second identification information related to the machine and/or the device).

Since the correspondence between the identification code and the entity information is provided on the side of the entity information table, for example, when the entity information (for example, the manufacturing number after the installation) is changed or when entity information is added, for example, the entity information can be added or the entity information can be changed without the QR code being changed.

Figure 4B:
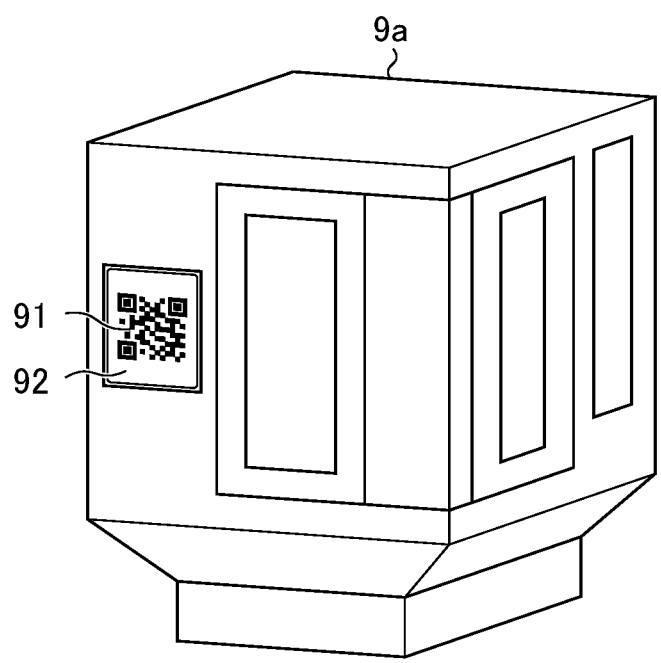
FIG. 4B is a diagram showing an example of attachment of the QR code in the first embodiment.

The QR code is not necessarily limited to the QR code which is provided to the machine tool 9a or the industrial robot 9b. For example, as shown in FIG. 4B, a QR code 91 may be displayed on a display device 92 such as a liquid crystal display included in the machine tool 9a. There is no limitation to the QR code, and instead of the QR code, another arbitrary code (such as a two-dimensional code or a barcode) may be applied.

When the QR code is not set, the acquisition unit 41 may directly acquire, through wired communication or wireless communication with the machine tool 9a, the industrial robot 9b or the like, the entity information such as the URL and the individual identification information from the machine tool 9a, the industrial robot 9b or the like.

The display unit 50 is a liquid crystal display or the like, and may display an answer received from the inquiry center system C of the supplier or the like.

For example, the camera 60 shoots the QR code so as to read the QR code.

The communication unit 70 is a communication control device which transmits and receives data to and from the relay device 1.

Then, the user side terminal 4 accesses the relay device 1 based on the URL read from the QR code, is passed through, for example, user authentication and is connected to the relay device 1.

The URL for accessing the relay device 1 does not need to be printed on the QR code, and for example, the URL may be previously set on the user side terminal 4 as a constant (variable) of an application which is downloaded in order to utilize the inquiry system 100.

After being connected to the relay device 1, the user side terminal 4 transmits the QR code (for example, the identification code) read with the camera 60 to the relay device 1. The relay device 1 acquires, based on the received QR code and the entity information table described previously, for example, the entity information which includes the individual identification information of the machine tool 9a or the like. As described previously, the entity information table may be not necessarily included in the relay device 1, and may be stored in an arbitrary storage unit which the relay device 1 can access.

Thereafter, the user side terminal 4 may provide, through the relay device 1, a user interface function of performing communication such as a chat with the inquiry center system C of the supplier which is selected. In other words, the user side terminal 4 may display, on the display unit 50, a user interface for displaying an input of an inquiry or a received answer.

The communication between the user side terminal 4 and the inquiry center system C of the supplier which is selected is not limited to a chat, and may be performed by mail, a voice call, an inquiry field in a web page or the like.

<Inquiry Center System C of Supplier>

The inquiry center system C of the supplier is, for example, a computer system which is provided within the inquiry center of the supplier. The inquiry center system C of the supplier includes, a control unit, a storage unit, an input unit, a display unit, a communication unit and the like which are not shown and which are provided in a computer system. The inquiry center system C of the supplier provides a user interface function for an operator. The inquiry center system C of the supplier may be a personal computer or the like, and may provide a user interface function of performing communication such as a chat with the user side terminal 4.

<Relay Processing of Relay Device 1>

An operation related to the relay processing of the relay device 1 according to the present embodiment will then be described.

FIG. 5 is a flowchart illustrating the relay processing of the relay device 1. It is assumed that in the relay processing, the user side terminal 4 is connected to the relay device 1.

In step S11, the communication unit 30 receives, from the user side terminal 4 in the end user site, the first identification information of the machine tool 9a or the industrial robot 9b, the machine information and the like. Specifically, the communication unit 30 acquires, through the QR code received from the user side terminal 4, the entity information including the individual identification information of the machine tool 9a, the industrial robot 9b or the like, and receives the machine information from the user side terminal 4.

In step S12, the determination unit 12 determines whether or not the machine information of the machine tool 9a, the industrial robot 9b or the like received in step S11 is new machine information for the individual identification information. When the machine information is new machine information, the processing proceeds to step S13. On the other hand, when the machine information is not new machine information, the processing proceeds to step S14.

In step S13, the determination unit 12 registers and stores the received machine information in the machine information storage unit 23.

In step S14, the selection unit 11 selects, based on the first identification information and the second identification information received in step S11, the inquiry center system C(k) of the supplier.

In step S15, the communication unit 30 connects together the user side terminal 4 in the end user site and the inquiry center system C(k) of the supplier which is selected.

In step S16, the communication unit 30 notifies the inquiry and the machine information from the user side terminal 4 in the end user site to the inquiry center system C(k) of the supplier.

The relay device 1 completes the inquiry destination selection processing. Thereafter, the relay device 1 relays the details of the inquiry exchanged between the user side terminal 4 in the end user site and the inquiry center system C(k) of the supplier which is selected.

In this way, the relay device 1 of the first embodiment receives at least the individual identification information of the machine and/or the device from the user side terminal 4 in the end user site. Then, the relay device 1 selects, based on the first identification information and the second identification information, the inquiry center system C of the supplier. The relay device 1 connects together the user side terminal 4 in the end user site and the inquiry center system C of the supplier which is selected.

In this way, even when the user in the end user site does not have advanced expertise, the relay device 1 can select, based on the individual identification information which is acquired with the user side terminal 4 as the first identification information, the inquiry center system C of the supplier which provides an appropriate answer. Then, it is possible to prevent the user in the end user site from being passed from one to another within the inquiry system 100, with the result that it is possible to solve the problem in an early stage.

The relay device 1 determines whether or not the machine information received from the user side terminal 4 is new machine information for the individual identification information, and when the machine information is determined to be new machine information, the relay device 1 registers the machine information in the machine information storage unit 23. In this way, the relay device 1 can acquire the latest machine information of the machine and/or the device in the end user site so as to be able to prevent a duplicate registration.

The first embodiment has been described above.

Variation 1 of First Embodiment

Although in the first embodiment described above, the selection unit 11 selects the inquiry center system C(k) of the supplier based on the individual identification information received from the user side terminal 4 in the end user site and the information stored in the history information storage unit 22 and the machine information storage unit 23, there is no limitation to this configuration.

For example, the communication unit 30 may receive, from the user side terminal 4 in the end user site, the individual identification information and position information (for example, GeoIP or GPS) of the user side terminal 4. Then, the selection unit 11 may select the inquiry center system C(k) of the supplier based on the individual identification information, the information stored in the history information storage unit 22 and the machine information storage unit 23 and the position information.

In this way, the selection unit 11 can select the position information of the user side terminal 4, that is, the nearest inquiry center system C of the supplier in which, for example, a maintenance person is easily arranged according to the installation position (including a country) of the machine tool 9a, the industrial robot 9b or the like.

Second Embodiment

A second embodiment will then be described. In the second embodiment, a relay device 1A further includes, in addition to the function of the first embodiment, a function in which when the position information from the end user site is different from the installation site of the machine and/or the device in the information stored on the database, the inquiry unit is made to select the installation site of the machine and/or the device.

In this way, the relay device 1A of the second embodiment can more accurately select the nearest inquiry center system of the supplier in which the arrangement of the maintenance person or the like is easy.

The second embodiment will be described below.

An inquiry system according to the second embodiment has the same configuration as the inquiry system 100 shown in FIG. 1 and according to the first embodiment.

The user side terminal 4 in the end user site and the inquiry center system C of the supplier in the second embodiment have the same configurations as in the first embodiment.

<Relay Device 1A>

Figure 6:
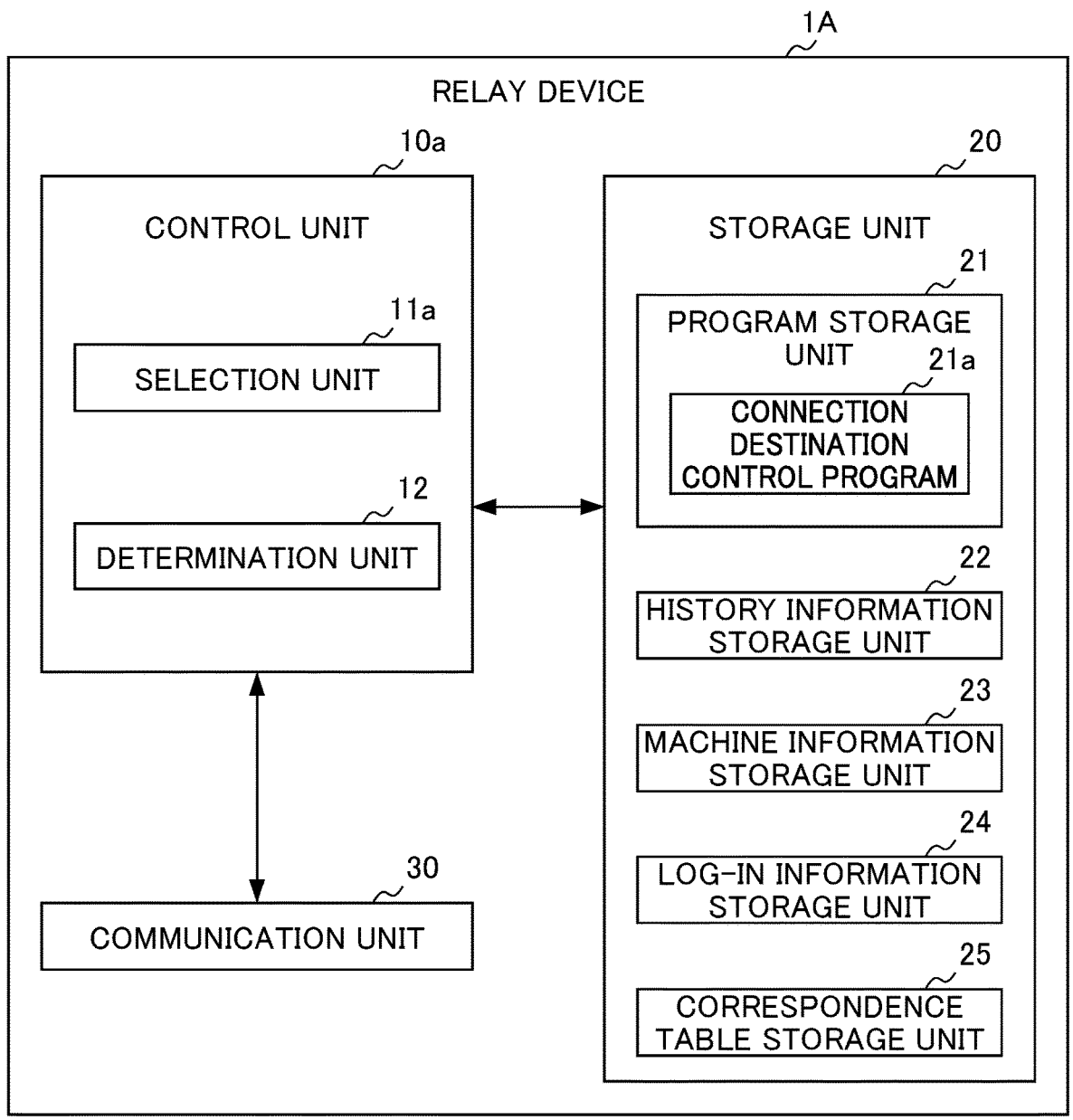
FIG. 6 is a functional block diagram showing an example of the functional configuration of a relay device according to a second embodiment.

FIG. 6 is a functional block diagram showing an example of the functional configuration of the relay device according to the second embodiment. Elements which have the same functions as the elements of the relay device 1 in FIG. 1 are identified with the same reference numerals, and the detailed description thereof will be omitted.

The relay device 1A according to the second embodiment includes, as with the relay device 1 according to the first embodiment, a control unit 10a, the storage unit 20 and the communication unit 30.

The control unit 10a includes a selection unit 11a and the determination unit 12. These functional units are realized by the execution of the connection destination control program 21a stored in the program storage unit 21 with the control unit 10a.

The selection unit 11a selects the inquiry center system C based on the first identification information of the machine and/or the device, the second identification information of the machine and/or the device and the position information received from the user side terminal 4.

For example, the selection unit 11a compares the installation site of the machine tool 9a or the industrial robot 9b which is received from the user side terminal 4, which is associated with the individual identification information attached to the machine tool 9a or the industrial robot 9b and which is stored on the database of the history information storage unit 22, the machine information storage unit 23 and the like with the position information (for example, GeoIP or GPS) acquired from the user side terminal 4, and thereby determines whether or not they agree with each other. When the installation site of the machine tool 9a or the industrial robot 9b agrees with the position information of the user side terminal 4, the selection unit 11a selects the inquiry center system C as with the selection unit 11 of the first embodiment.

On the other hand, when the installation site of the machine tool 9a or the industrial robot 9b does not agree with the position information of the user side terminal 4, the selection unit 11a cannot select the optimal inquiry center system C of the supplier. Hence, the selection unit 11a makes the user of the user side terminal 4 select the installation site of the machine tool 9a or the industrial robot 9b.

More specifically, for example, when the machine tool 9a or the industrial robot 9b is first installed in a factory in an "X country", and is thereafter transferred to a factory in an "A country", the installation site of the machine tool 9a or the industrial robot 9b which is associated with the individual identification information attached to the machine tool 9a or the industrial robot 9b and which is stored on the database remains the "X country" as long as the information on the database is not updated such as by the user of the user side terminal 4. On the other hand, it is likely that for example, the position information of the user side terminal 4 acquired by the user side terminal 4 from a GPS signal indicates the "A country" and that the position information acquired from the position information (GeoIP) indicated by the connection base of a communication company with which the user side terminal 4 contracts indicates a "B country".

Hence, for example, the selection unit 11a displays, for the user side terminal 4, a list such as "The inquiry region cannot be identified. Make a selection from 1. A country (GPS), 2. B country (GeoIP) and 3. X country (database)" so as to make the user of the user side terminal 4 select the country. For example, when the user of the user side terminal 4 selects the "A country", the selection unit 11a can select the nearest inquiry center system C of the supplier in the selected "A country" in which for example, a maintenance person is easily arranged.

The installation site and the position information are not limited to the country unit, and may be a region in a prefecture, a municipality or the like.

Instead of displaying the acquired position information as a list, the selection unit 11a may display, for the user side terminal 4, the acquired position information on a map so as to make the user side terminal 4 select the position information (region) displayed on the map. Alternatively, the selection unit 11a may display an input field for making the user side terminal 4 input an address, a zip code or the like so as to make the user side terminal 4 input the address, the zip code or the like.

The determination unit 12 has a function similar to that of the determination unit 12 in the first embodiment.

<Relay Processing of Relay Device 1A>

An operation related to the relay processing of the relay device 1A according to the present embodiment will be then described.

Figure 7:
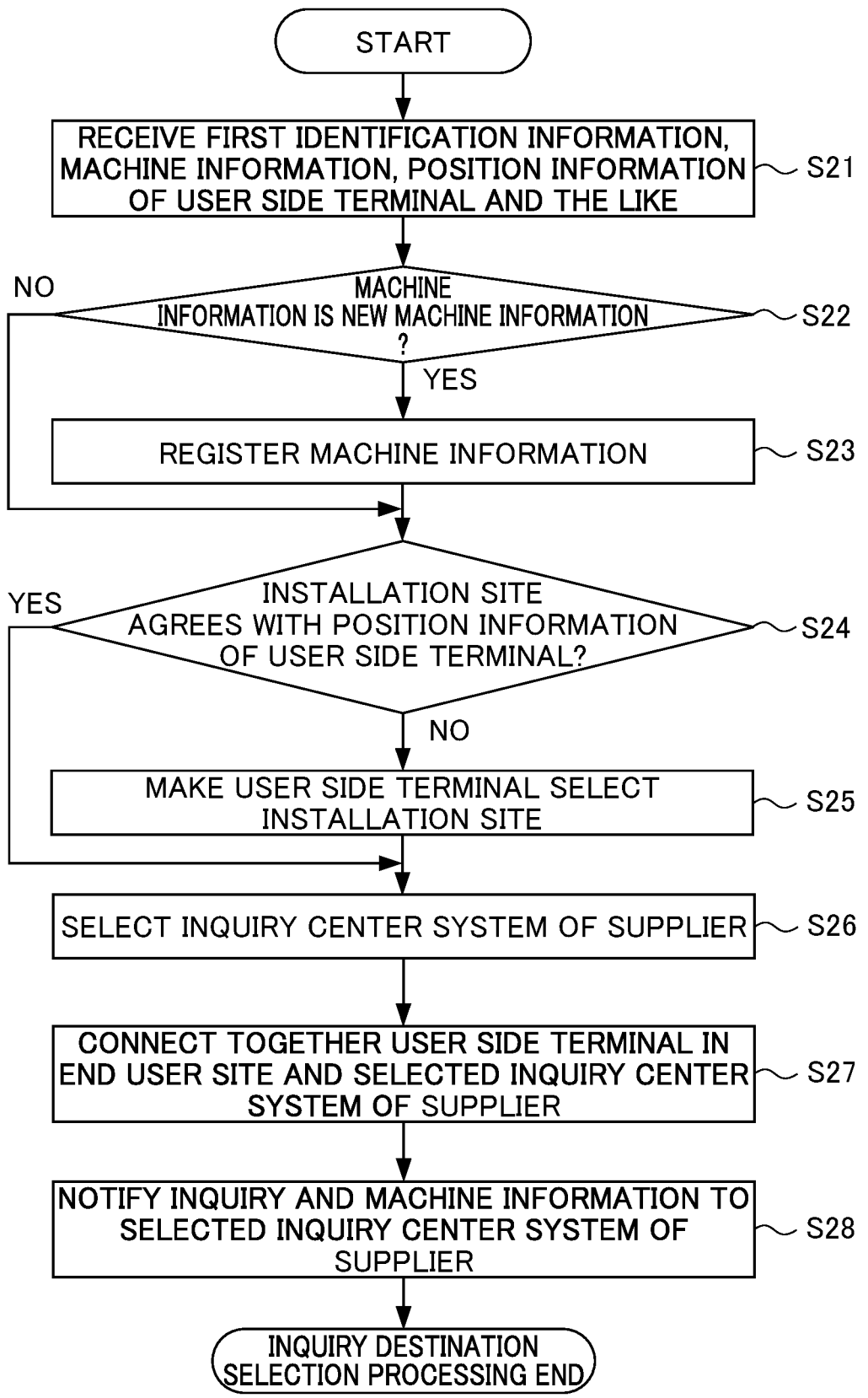
FIG. 7 is a flowchart illustrating the relay processing of the relay device according to the second embodiment.

FIG. 7 is a flowchart illustrating the relay processing of the relay device 1A.

In the relay processing shown in FIG. 7, processing from step S22 to step S23 and processing from step S26 to step S28 are the same as that from step S12 to step S13 and that from step S14 to step S16 in the first embodiment of FIG. 5, and thus the description thereof will be omitted.

In step S21, the communication unit 30 receives, from the user side terminal 4 in the end user site, the first identification information of the machine tool 9a or the industrial robot 9b, the machine information, the position information of the user side terminal 4 and the like.

In step S24, the selection unit 11a determines whether or not the installation site of the machine tool 9a or the industrial robot 9b which is received in step S21, which is associated with the individual identification information of the machine tool 9a or the industrial robot 9b and which is stored on the database agrees with the position information of the user side terminal 4. When the installation site of the machine tool 9a or the industrial robot 9b agrees with the position information of the user side terminal 4, the processing proceeds to step S26. On the other hand, when the installation site of the machine tool 9a or the industrial robot 9b does not agree with the position information of the user side terminal 4, the processing proceeds to step S25.

In step S25, the selection unit 11a displays a list for selecting the installation site of the machine tool 9a or the industrial robot 9b so as to make the user side terminal 4 select the installation site.

In this way, the relay device 1A of the second embodiment receives, from the user side terminal 4 in the end user site, the individual identification information of the machine and/or the device, the machine information and the position information of the user side terminal 4. The relay device 1A determines whether or not the installation site of the machine and/or the device associated with the individual identification information and based on the information on the database agrees with the position information of the user side terminal 4, and when they do not agree with each other, the user side terminal 4 is made to select the installation site of the machine and/or the device. In this way, the relay device 1A can select the inquiry center system C of the supplier based on the first identification information, the second identification information and the installation site selected by the user of the user side terminal 4. The relay device 1A can connect together the user side terminal 4 in the end user site and the inquiry center system C of the supplier which is selected.

As described above, even when the user in the end user site does not have advanced expertise, the relay device 1A can select, based on the individual identification information which is acquired with the user side terminal 4 as the first identification information, the inquiry center system C of the supplier which provides an appropriate answer. Then, it is possible to prevent the user in the end user site from being passed from one to another within the inquiry system 100, with the result that it is possible to solve the problem in an early stage.

When the installation site of the machine and/or the device associated with the individual identification information and based on the information on the database does not agree with the position information of the user side terminal 4, by making the user side terminal 4 select the installation site of the machine and/or the device, the relay device 1A can more accurately select the nearest inquiry center system C of the supplier in which the arrangement of the maintenance person or the like is easy.

The second embodiment has been described above.

Third Embodiment

A third embodiment will then be described. In the third embodiment, a relay device 1B further includes, in addition to the function of the first embodiment, a function of monitoring the details of the inquiry from the end user site.

In this way, the relay device 1B of the third embodiment searches for an answer to the inquiry based on the result of the monitoring of the details of the inquiry, the individual identification information serving as the first identification information, the inquiry history serving as the second identification information and the like. The relay device 1B transmits the answer found from the search to the terminal device in the end user site without providing notification to the inquiry center system of the supplier.

In this way, the relay device 1B searches the history information of inquiries and the like based on the details of the inquiry from the end user site, and transmits the answer found from the search to the end user site so as to be able to rapidly answer to the end user site without being connected to the inquiry center system of the supplier.

The third embodiment will be described below.

The inquiry system according to the third embodiment has the same configuration as the inquiry system 100 shown in FIG. 1 and according to the first embodiment.

The user side terminal 4 in the end user site and the inquiry center system C of the supplier in the third embodiment have the same configurations as in the first embodiment.

<Relay Device 1B>

Figure 8:
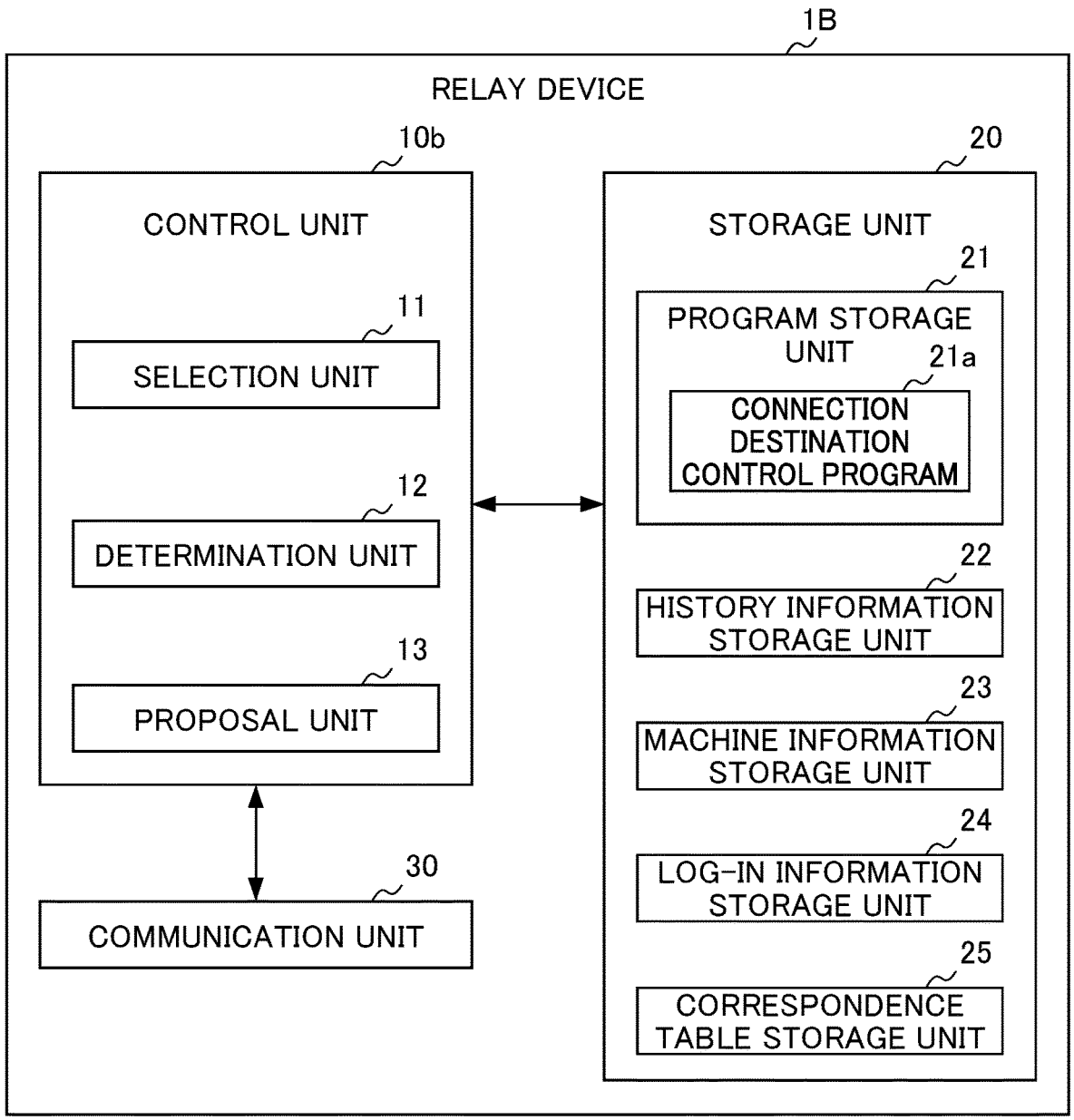
FIG. 8 is a functional block diagram showing an example of the functional configuration of a relay device according to a third embodiment.

FIG. 8 is a functional block diagram showing an example of the functional configuration of the relay device according to the third embodiment. Elements which have the same functions as the elements of the relay device 1 in FIG. 1 are identified with the same reference numerals, and the detailed description thereof will be omitted.

The relay device 1B according to the third embodiment includes, as with the relay device 1 according to the first embodiment, a control unit 10b, the storage unit 20 and the communication unit 30.

The control unit 10b includes the selection unit 11, the determination unit 12 and a proposal unit 13. These functional units are realized by the execution of the connection destination control program 21a stored in the program storage unit 21 with the control unit 10b.

The selection unit 11 and the determination unit 12 have functions similar to those of the selection unit 11 and the determination unit 12 in the first embodiment.

The proposal unit 13 monitors the details of the inquiry from the user side terminal 4, and proposes an answer (solution) to the user side terminal 4 before notification to the inquiry center system when the answer is present on the database.

The proposal unit 13 monitors the details of the inquiry from the user side terminal 4 in the end user site serving as the inquiry unit, and proposes the solution to the user side terminal 4 before notification to the inquiry center system C of the supplier when the solution is present on the database of the history information storage unit 22, the machine information storage unit 23 and the like.

In an example, for example, when the first inquiry from the user side terminal 4 in the end user site is related to an alarm, and an "alarm 100" or the like is found as a result of monitoring of the details of the inquiry, the proposal unit 13 automatically returns, to the user side terminal 4 in the end user site, an answer (solution) "A state where the parameter setting can be changed is entered. Set PWE on the setting screen to 0 for safety" which is present on the database of the history information storage unit 22, the machine information storage unit 23 and the like.

As described above, the relay device 1B proposes, before the selection of the inquiry center system C of the supplier, the answer (solution) found for the user side terminal 4 in the end user site, and thereby can rapidly solve the problem which occurs in the end user site.

In the monitoring of the details of the inquiry with the proposal unit 13, the storage unit 20 may previously store, for example, keywords such as the "alarm 100" for each of the machine and/or the device. Then, the proposal unit 13 may use, for example, a method such as known pattern matching so as to determine whether or not the answer (solution) is present on the database by comparison of the keyword and the details of the inquiry.

<Relay Processing of Relay Device 1B>

An operation related to the relay processing of the relay device 1B according to the present embodiment will be then described.

Figure 9:
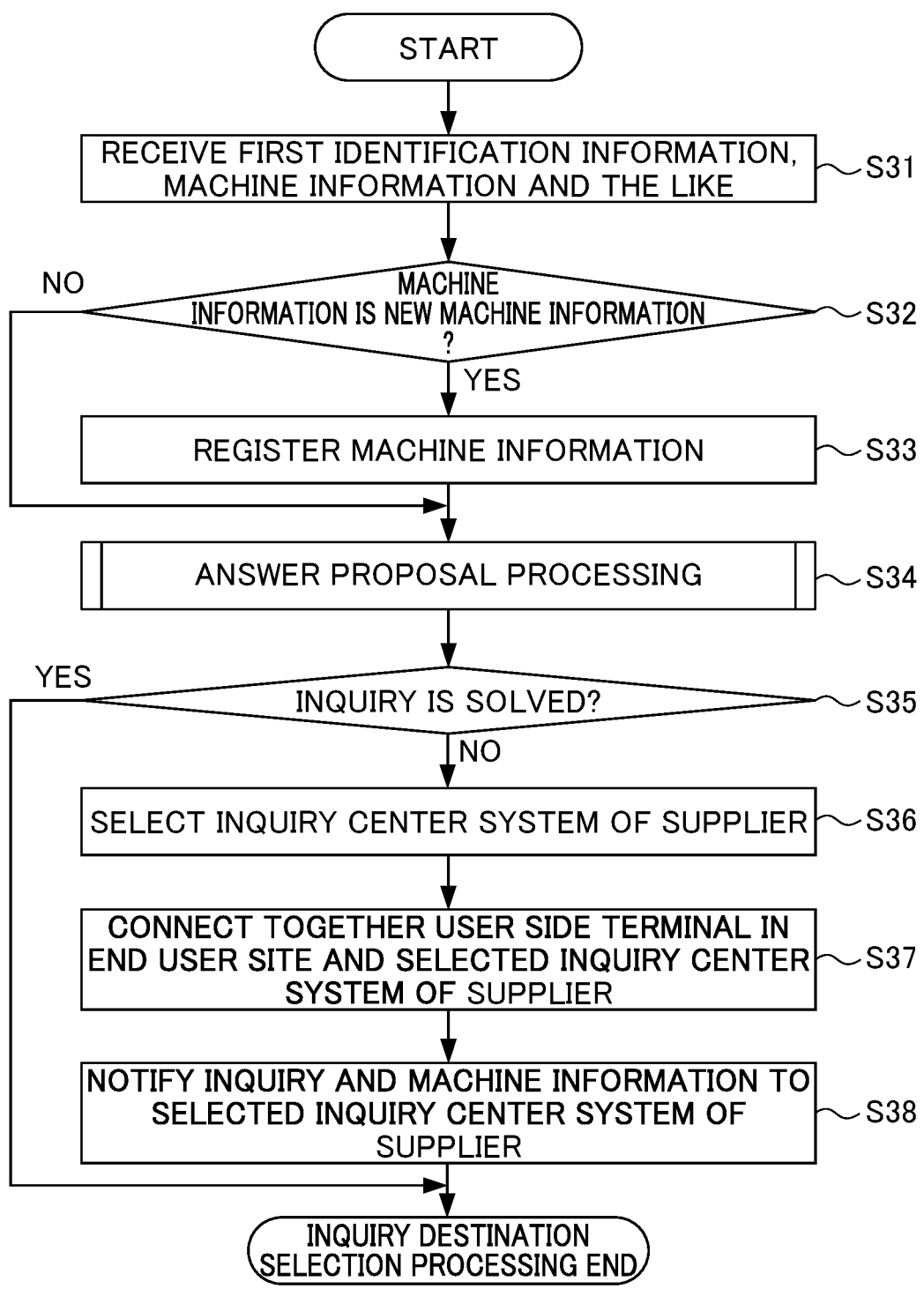
FIG. 9 is a flowchart illustrating the relay processing of the relay device according to the third embodiment.

FIG. 9 is a flowchart illustrating the relay processing of the relay device 1B.

In the relay processing shown in FIG. 9, processing from step S31 to step S33 and processing from step S36 to step S38 are the same as that from step S11 to step S13 and that from step S14 to step S16 in the first embodiment of FIG. 5, and thus the description thereof will be omitted.

In step S34, the proposal unit 13 performs answer proposal processing on the details of the inquiry from the user side terminal 4 in the end user site which receives the first identification information in step S31. The detailed flow of the answer proposal processing will be described later.

In step S35, the proposal unit 13 determines, by the answer proposal processing in step S34, whether or not the inquiry of the user side terminal 4 is solved. When the inquiry is solved, the inquiry destination selection processing is completed.

On the other hand, when the inquiry is not solved, the processing from step S36 to step S38 is performed. The relay device 1B completes the inquiry destination selection processing. Thereafter, the relay device 1B relays the details of the inquiry exchanged between the user side terminal 4 in the end user site and the inquiry center system C(k) of the supplier which is selected.

Figure 10:
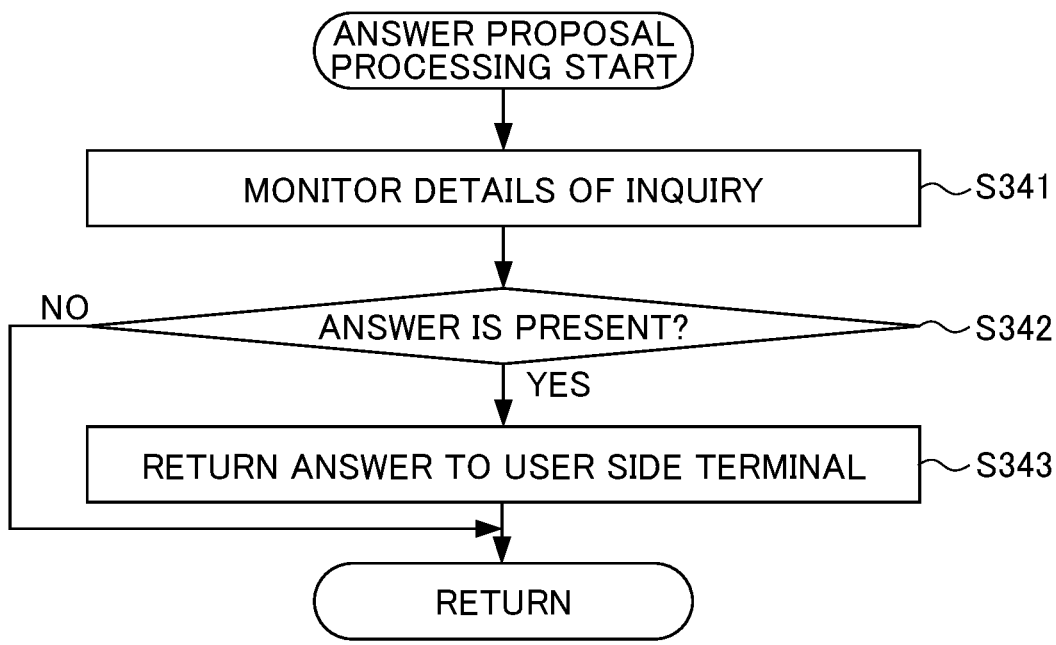
FIG. 10 is a flowchart illustrating answer proposal processing shown in FIG. 9.

FIG. 10 is a flowchart illustrating the details of the answer proposal processing shown in step S34 of FIG. 9. In the flowchart of FIG. 10, steps S341 to S343 indicate the flow of processing of the proposal unit 13.

In step S341, the proposal unit 13 monitors the details of the inquiry from the user side terminal 4 in the end user site.

In step S342, the proposal unit 13 determines, based on the result of the monitoring in step S341, whether or not the answer (solution) is present on the database. When the answer (solution) is present on the database, the processing proceeds to step S343. On the other hand, when the answer (solution) is not present on the database, the processing proceeds to step S35.

In step S343, the proposal unit 13 returns, through the communication unit 30, the answer (solution) present on the database to the user side terminal 4. The flow of the answer proposal processing has been completed, and the processing proceeds to step S35.

In this way, the relay device 1B of the third embodiment monitors the details of the inquiry from the user side terminal 4 in the end user site. When the answer is present on the database, the relay device 1B proposes the answer (solution) for the user side terminal 4 in the end user site before notification to the inquiry center system C of the supplier. In this way, the relay device 1B can rapidly solve the problem which occurs in the end user site in addition to the effects that can be achieved in the first embodiment.

The third embodiment has been described above.

Variation 1 of Third Embodiment

Although in the third embodiment described above, the relay device 1B returns the answer (solution) present on the database to the user side terminal 4 in the end user site, when the problem is not solved by the answer (solution), the answer (solution) may be notified to the inquiry center system C(k) of the supplier which is selected. In this way, the inquiry center system C(k) of the supplier can check whether or not the answer received from the relay device 1B is correct, and thereby can more accurately answer to the inquiry from the user side terminal 4 in the end user site.

Fourth Embodiment

A fourth embodiment will then be described. The relay device 1B according to the fourth embodiment further includes, in addition to the function of the third embodiment, a function of monitoring the details of the inquiry transmitted and received to and from the inquiry center system of the supplier which is selected.

In this way, the relay device 1B according to the fourth embodiment determines, based on the result of the monitoring of the details of the inquiry, whether or not machine data indicating the state of the machine and/or the device is needed, and acquires the machine data automatically or by the operation of the user side terminal 4 in the end user site.

The relay device 1B according to the fourth embodiment transfers the machine data acquired from the user side terminal 4 to the inquiry center system of the supplier which is selected, and thus the inquiry center system of the supplier can analyze the received machine data, with the result that it is possible to rapidly solve the problem which occurs in the end user site.

The fourth embodiment will be described below.

The inquiry system according to the fourth embodiment has the same configuration as the inquiry system 100 shown in FIG. 1 and according to the first embodiment.

The user side terminal 4 in the end user site and the inquiry center system C of the supplier in the fourth embodiment have the same configurations as in the first embodiment.

The relay device according to the fourth embodiment has the same configuration as the relay device 1B shown in FIG. 8 and according to the third embodiment.

When the proposal unit 13 monitors the details of the inquiry and determines that the machine data indicating the state of the machine and/or the device is needed, the proposal unit 13 acquires the machine data automatically or by the operation of the user side terminal 4, and provides the acquired machine data to the selected inquiry center system.

The proposal unit 13 monitors the details of the inquiry between the user side terminal 4 in the end user site and the selected inquiry center system, and determines, based on the result of the monitoring of the details of the inquiry, whether or not the machine data indicating the state of the machine and/or the device is needed. The proposal unit 13 further includes a function of acquiring, when determining that the machine data is needed, the machine data automatically or by the operation of the user side terminal 4 with the user and providing the acquired machine data to the inquiry center system C of the supplier which is selected.

Here, the machine data refers to physical data which is stored or collected with the controller of a machine tool, a robot or the like and an external measurement device, and includes setting data such as a parameter, alarm data, the observation data of an internal state, the observation data of a sensor and the like.

For example, the proposal unit 13 monitors the details of the inquiry between the user side terminal 4 in the end user site and the inquiry center system C of the supplier which is selected, and determines, based on the result of the monitoring of the details of the inquiry, whether or not the machine data indicating the state of the machine and/or the device is needed. When the proposal unit 13 determines that the machine data is needed, the proposal unit 13 acquires the machine data automatically or by the operation of the user side terminal 4 with the user.

In an example, when the proposal unit 13 finds the details of a dialog on "servo adjustment" from the details of the inquiry in a chat or the like between the user side terminal 4 in the end user site and the inquiry center system C(k) of the supplier which is selected, the proposal unit 13 transmits an instruction to request an NC parameter as the machine data to the user side terminal 4. The user side terminal 4 transmits, based on the instruction from the relay device 1B, the data (machine data) of the NC parameter to the relay device 1B. The communication unit 30 of the relay device 1B provides the data of the NC parameter acquired from the user side terminal 4 to the inquiry center system C(k) of the supplier which is selected.

The inquiry center system C(k) of the supplier analyzes the received NC parameter so as to be able to provide an instruction to adjust a servo speed gain parameter to the user side terminal 4. In this way, the inquiry center system C(k) of the supplier can rapidly solve the problem which occurs in the end user site.

<Machine Data Acquisition Processing of Relay Device 1B>

An operation related to the machine data acquisition processing of the relay device 1B according to the present embodiment will then be described.

Figure 11:
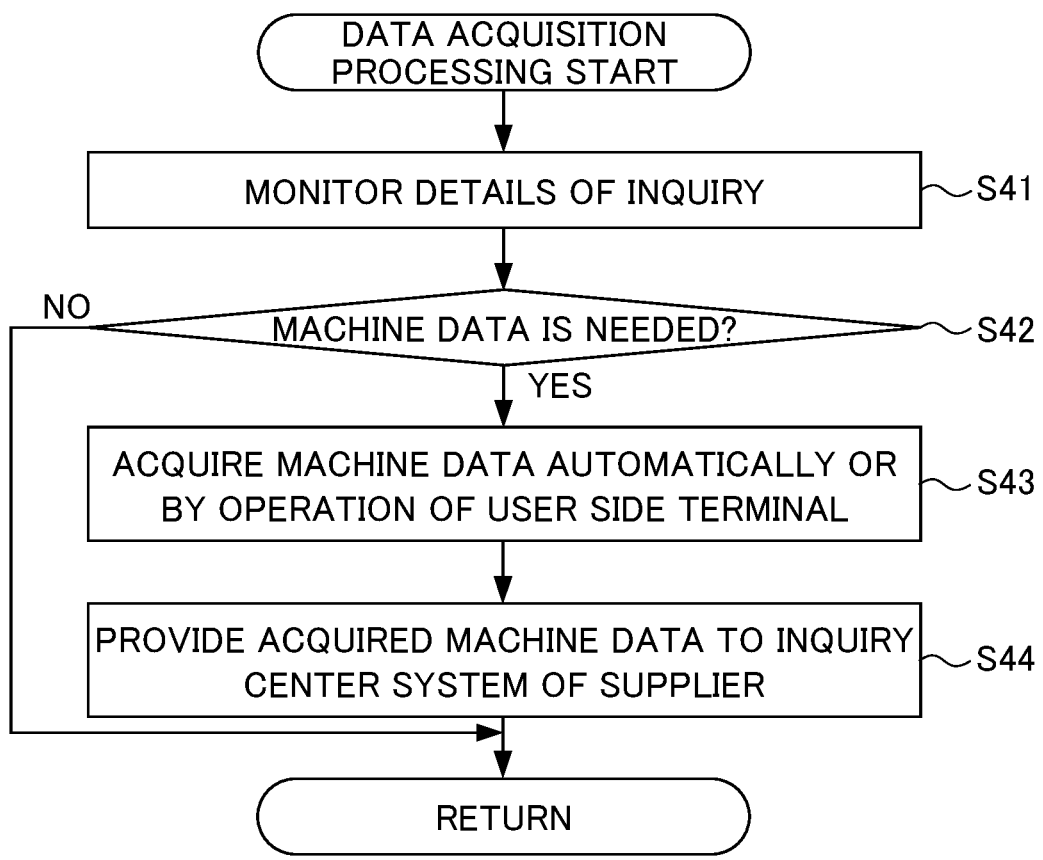
FIG. 11 is a flowchart illustrating machine data acquisition processing in a fourth embodiment.

FIG. 11 is a flowchart illustrating the machine data acquisition processing of the relay device 1B.

The machine data acquisition processing shown in FIG. 11 is executed, for example, when the inquiry destination selection processing shown in FIG. 9 is performed and thereafter an exchange on the inquiry is made between the user side terminal 4 in the end user site and the inquiry center system C(k) of the supplier which is selected.

In step S41, the proposal unit 13 monitors the details of the inquiry exchanged between the user side terminal 4 in the end user site and the inquiry center system C(k) of the supplier which is selected.

In step S42, the proposal unit 13 determines, based on the result of the monitoring in step S41, whether or not the machine data indicating the state of the machine and/or the device is needed. When the proposal unit 13 determines that the machine data is needed, the processing proceeds to step S43. On the other hand, when the proposal unit 13 determines that the machine data is not needed, the machine data acquisition processing is completed.

In step S43, the proposal unit 13 acquires the machine data automatically or by the operation of the user side terminal 4 with the user.

In step S44, the proposal unit 13 provides, through the communication unit 30, the machine data acquired from the user side terminal 4 to the inquiry center system C(k) of the supplier which is selected.

In this way, the relay device 1B of the fourth embodiment monitors the details of the inquiry between the user side terminal 4 in the end user site and the inquiry center system C(k) of the supplier which is selected, and thereby determines whether or not the machine data indicating the state of the machine and/or the device is needed. When the relay device 1B determines that the machine data is needed, the relay device 1B acquires the machine data automatically or by the operation of the user side terminal 4. In this way, in addition to the effects that can be achieved in the third embodiment, the relay device 1B provides the machine data acquired from the user side terminal 4 to the inquiry center system of the supplier which is selected, and thus the inquiry center system C of the supplier can analyze the received machine data, with the result that it is possible to rapidly solve the problem which occurs in the end user site.

The fourth embodiment has been described above.

Fifth Embodiment

A fifth embodiment will then be described. The relay device 1B according to the fifth embodiment further includes, in addition to the function of the fourth embodiment, a function of proposing, when determining that the inquiry center system needs to be changed, a new inquiry center system of a supplier for either or both of the end user site and the inquiry center system.

In this way, the relay device 1B according to the fifth embodiment can select a more appropriate inquiry center system, and thus the inquiry center system can rapidly solve the problem which occurs in the end user site.

The fifth embodiment will be described below.

The inquiry system according to the fifth embodiment has the same configuration as the inquiry system 100 shown in FIG. 1 and according to the first embodiment.

The user side terminal 4 in the end user site and the inquiry center system C of the supplier in the fifth embodiment have the same configurations as in the first embodiment.

The relay device according to the fifth embodiment has the same configuration as the relay device 1B shown in FIG. 8 and according to the third embodiment.

When the proposal unit 13 monitors the details of the inquiry, and determines that the inquiry center system needs to be changed, the proposal unit 13 proposes a new inquiry center system for either or both of the user side terminal 4 and the selected inquiry center system.

For example, the proposal unit 13 monitors the details of the inquiry exchanged between the user side terminal 4 in the end user site and the inquiry center system C(k) of the supplier which is selected, and determines, based on the result of the monitoring of the details of the inquiry, whether or not the inquiry center system C(k) of the supplier which is selected needs to be changed. When the proposal unit 13 determines that the inquiry center system C(k) of the supplier needs to be changed, the proposal unit 13 proposes a new inquiry center system C(i) of a supplier for either or both of the user side terminal 4 in the end user site and the inquiry center system C(k) of the supplier. Here, i is an integer of any one of 1 to n, and is a value different from k.

In an example, the proposal unit 13 monitors the details of the inquiry between the user side terminal 4 in the end user site and the inquiry center system C(k) of the supplier which is first selected based on an inquiry on a "machining failure" from the user side terminal 4. When the proposal unit 13 finds the details of a dialog on "resonance caused by an excessive servo gain" from the details of the inquiry in a chat or the like between the user side terminal 4 and the inquiry center system C(k) of the supplier, the proposal unit 13 may propose a consultation with the new inquiry center system C(i) of the supplier for the current inquiry center system C(k) of the supplier.

The proposal unit 13 may propose the change to the new inquiry center system C(i) of the supplier for the user side terminal 4.

Thereafter, the current inquiry center system C(k) of the supplier contacts the new inquiry center system C(i) of the supplier after receiving approval of the end user site so as to request the subsequent actions.

In other words, the inquiry system 100 has a transfer function and a sharing function. In this way, the relay device 1B can select a more appropriate inquiry center system C of the supplier, and thus the inquiry center system C of the supplier can rapidly solve the problem which occurs in the end user site.

<Inquiry Center Proposal Processing of Relay Device 1B>

An operation related to the inquiry center proposal processing of the relay device 1B according to the present embodiment will then be described.

Figure 12:
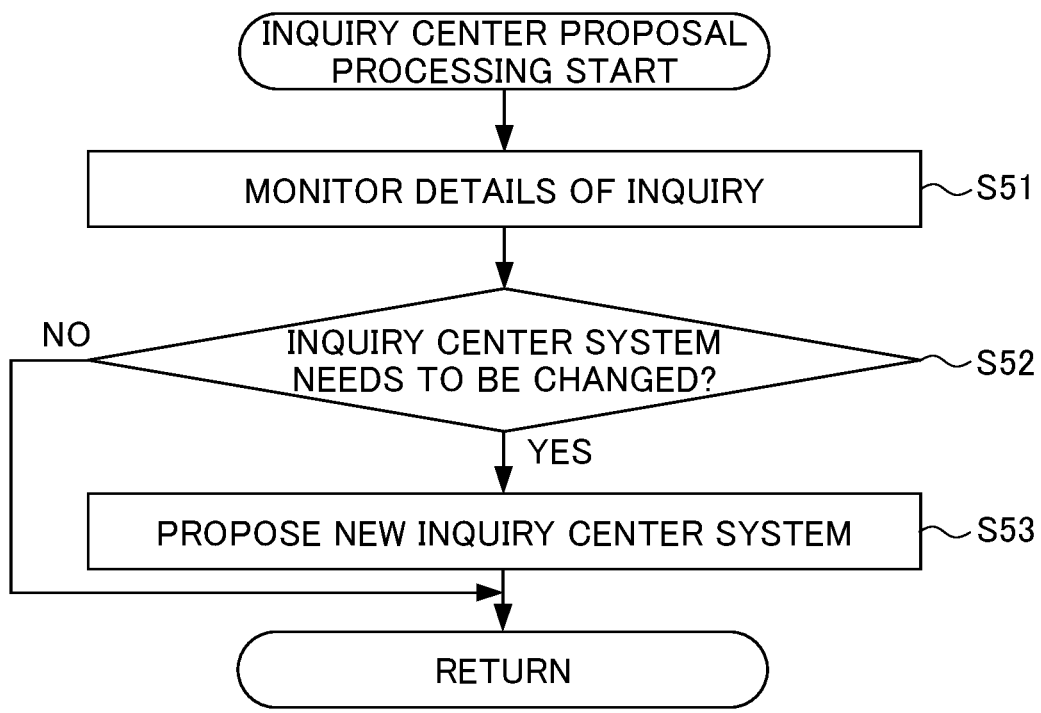
FIG. 12 is a flowchart illustrating inquiry center proposal processing in a fifth embodiment.

FIG. 12 is a flowchart illustrating the inquiry center proposal processing of the relay device 1B.

The inquiry center proposal processing shown in FIG. 12 is executed, for example, when the inquiry destination selection processing shown in FIG. 9 is performed and thereafter an exchange on the inquiry is made between the user side terminal 4 in the end user site and the inquiry center system C(k) of the supplier which is selected.

In step S51, the proposal unit 13 monitors the details of the inquiry exchanged between the user side terminal 4 in the end user site and the inquiry center system C(k) of the supplier which is selected.

In step S52, the proposal unit 13 determines, based on the result of the monitoring in step S51, whether or not the inquiry center system C(k) of the supplier which is selected needs to be changed. When the proposal unit 13 determines that the inquiry center system C(k) of the supplier needs to be changed, the processing proceeds to step S53. On the other hand, when the proposal unit 13 determines that the inquiry center system C(k) of the supplier does not need to be changed, the inquiry center proposal processing is completed.

In step S53, the proposal unit 13 proposes the new inquiry center system C(i) of the supplier for either or both of the user side terminal 4 in the end user site and the inquiry center system C(k) of the supplier.

Thereafter, for example, the current inquiry center system C(k) of the supplier contacts the new inquiry center system C(i) of the supplier after receiving approval of the end user site so as to request the subsequent actions. The flow of the inquiry center proposal processing has been completed.

In this way, the relay device 1B of the fifth embodiment monitors the details of the inquiry between the user side terminal 4 in the end user site and the inquiry center system C(k) of the supplier which is selected, and thereby determines whether or not the inquiry center system C(k) of the supplier which is selected needs to be changed. When the relay device 1B determines that the inquiry center system C(k) of the supplier needs to be changed, the relay device 1B proposes the new inquiry center system C(i) of the supplier for either or both of the user side terminal 4 and the current inquiry center system C(k) of the supplier. In this way, in addition to the effects that can be achieved in the fourth embodiment, the relay device 1B can select a more appropriate inquiry center system C of the supplier, and thus the inquiry center system C of the supplier can rapidly solve the problem which occurs in the end user site.

The fifth embodiment has been described above.

Although the first to fifth embodiments have been described above, the relay devices 1, 1A and 1B are not limited to the embodiments described above, and variations, modifications and the like are included therein as long as the purposes thereof can be achieved.

<Variation 1>

Although in the first to fifth embodiments discussed above, the case where the QR code is provided to the machine tool 9a or the industrial robot 9b is described as an example, there is no limitation to this configuration. For example, a two-dimensional code other than the QR code may be provided or a barcode or the like may be provided.

The entity information corresponding to the QR code (identification code) provided to the machine tool 9a or the industrial robot 9b is not limited to the individual identification information, and the entity information may be device identification information (model information) with which it is possible to identify the machine tool 9a or the industrial robot 9b. As the device identification information (model information), for example, a serial number, a unique name provided to the machine tool 9a or the industrial robot 9b in the end user site or the like with which it is possible to identify the machine tool 9a or the industrial robot 9b may be provided.

<Variation 2>

For example, although in the first to fifth embodiments discussed above, as the relay device 1, 1A or 1B, one relay device is provided, there is no limitation to this configuration. For example, the functions of the selection unit 11 and the determination unit 12 in the relay device 1, the selection unit 11a and the determination unit 12 in the relay device 1A or the selection unit 11, the determination unit 12 and the proposal unit 13 in the relay device 1B may be realized by utilization of, for example, virtual server functions on a cloud.

As the relay device 1, 1A or 1B, a distributed processing system may be used in which the functions of the relay device 1, 1A or 1B are distributed to a plurality of servers as necessary.

The storage unit (for example, the history information storage unit 22 and the machine information storage unit 23) which is included in the storage unit 20 of the relay device 1, 1A or 1B and which stores the first identification information related to the machine and/or the device and the second identification information related to the machine and/or the device may be arranged in a server separate from the relay device 1, 1A or 1B, and part or the whole thereof may be arranged in any one of the machine tool 9a, the industrial robot 9b, the user side terminal 4 and the inquiry center system C of the supplier.

The individual functions of the inquiry systems 100 and the relay devices 1, 1A and 1B according to the first to fifth embodiments can be realized by hardware, software or a combination thereof. Here, the realization by software means realization by reading and executing programs with a computer.

Individual constituent units included in the inquiry systems 100 and the relay devices 1, 1A and 1B can be realized by hardware including an electronic circuit and the like, software or a combination thereof.

The programs are stored with various types of non-transitory computer readable media and can be supplied to the computer. The non-transitory computer readable media include various types of tangible storage media. Examples of the non-transitory computer readable medium include magnetic recording media (for example, a flexible disk, a magnetic tape and a hard disk drive), a magneto-optical recording medium (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM). The programs may be supplied to the computer with various types of transitory computer readable media. Examples of the transitory computer readable medium include electrical signals, optical signals and electromagnetic waves. The transitory computer readable media can supply the programs to the computer through a wired communication path such as an electric wire or an optical fiber or a wireless communication path.

Steps in which the programs are described so as to be recorded in the recording medium include not only processing which is chronologically performed along the order thereof but also processing which is not always chronologically performed and which is executed in parallel or individually.

In other words, the inquiry system and the relay device of the present disclosure can take various types of embodiments having configurations as described below.

(1) An inquiry system 100 of the present disclosure is an inquiry system in which an inquiry unit that is a terminal device (user side terminal 4) of a user of a machine and/or a device makes inquiries related to the machine and/or the device to a plurality of inquiry center systems C of suppliers including a maker of the machine and/or the device, and includes: a relay device 1 which connects together the user side terminal 4 and the inquiry center systems C; and a storage unit 20 which stores first identification information related to the machine and/or the device and second identification information related to the machine and/or the device, the user side terminal 4 includes: an acquisition unit 41 which acquires the first identification information related to the machine and/or the device; and a first communication unit (communication unit 70) which transmits the first identification information acquired by the acquisition unit 41 to the relay device 1, the relay device 1 includes: a second communication unit (communication unit 30) which communicates between the user side terminal 4 and the inquiry center systems C; and a selection unit 11 which selects, based on the first identification information and the second identification information, the inquiry center system C and the second communication unit connects together the user side terminal 4 and the inquiry center system C selected by the selection unit 11.

In the inquiry system 100, it is possible to select the inquiry center system C which provides an appropriate answer even when the user in an end user site does not have advanced expertise.

(2) Preferably, in the inquiry system 100 described in (1), the acquisition unit 41 acquires machine information of the machine and/or the device, the relay device 1 includes a determination unit 12 which determines whether or not the machine information needs to be stored in the storage unit 20 and the determination unit 12 stores, in the storage unit 20, the machine information which is determined to need to be stored.

In this way, it is possible to acquire the latest machine information of the machine and/or the device in the end user site so as to be able to prevent a duplicate registration.

(3) Preferably, in the inquiry system 100 described in (2), the determination unit 12 notifies the machine information acquired by the acquisition unit 41 to the selected inquiry center system C.

In this way, even in the selected inquiry center system C of the supplier, it is possible to acquire the latest information of the device and/or the device in the end user site.

(4) Preferably, in the inquiry system 100 described in (2), the determination unit 12 notifies the machine information determined by the determination unit 12 to need to be stored to the selected inquiry center system C.

In this way, even in the selected inquiry center system C of the supplier, it is possible to acquire the latest and different machine information of the device and/or the device in the end user site.

(5) Preferably, in the inquiry system 100 described in any one of (1) to (4), the first identification information includes either of individual identification information of the machine and/or the device and model information of the machine and/or the device.

In this way, only the individual identification information (model information) is acquired from the user side terminal 4, and thus it is possible to select the inquiry center system C of the supplier which provides an appropriate answer.

(6) Preferably, in the inquiry system 100 described in any one of (1) to (5), the second identification information includes any one of an inquiry history, a repair history of the machine and/or the device, an installation site of the machine and/or the device, part information of the machine and/or the device, version information of software of the machine and/or the device, setting information of the machine and/or the device, alarm information generated in the machine and/or the device, user information of the machine and/or the device, manufacturer information of the machine and/or the device, and sales maker information of the machine and/or the device.

In this way, the inquiry center system C of the supplier which provides an appropriate an answer can be selected with high accuracy.

(7) Preferably, in the inquiry system 100 described in any one of (2) to (4), the machine information acquired by the acquisition unit 41 includes the second identification information.

In this way, the same effects as in (2) to (4) can be achieved.

(8) Preferably, in the inquiry system 100 described in any one of (1) to (7), the communication unit 30 receives the first identification information and position information of the user side terminal 4, and the selection unit 11a selects the inquiry center system C based on the first identification information, the second identification information, and the position information of the user side terminal 4.

In this way, it is possible to select the nearest inquiry center system C of the supplier in which the arrangement of a maintenance person or the like is easy.

(9) Preferably, in the inquiry system 100 described in (8), at least when the installation site of the machine and/or the device based on the first identification information and the second identification information is different from the position information of the user side terminal 4, the selection unit 11a makes the user side terminal 4 select the installation site of the machine and/or the device.

In this way, even when the installation site of the machine and/or the device associated with the individual identification information and based on information on database is different from the position information of the user side terminal 4, it is possible to select the nearest inquiry center system C of the supplier in which the arrangement of a maintenance person or the like is easy.

(10) Preferably, in the inquiry system 100 described in (9), the selection unit 11a displays, as a list, for the user side terminal 4, the installation site of the machine and/or the device based on the first identification information and the second identification information and the position information of the user side terminal 4 so as to make the user side terminal 4 make a selection.

In this way, the user of the user side terminal 4 can easily select the installation site.

(11) Preferably, in the inquiry system 100 described in (9), the selection unit 11a displays, as a map, for the user side terminal 4, the installation site of the machine and/or the device based on the first identification information and the second identification information and the position information of the user side terminal 4 so as to make the user side terminal 4 select a region.

In this way, the user of the user side terminal 4 can easily select the installation site.

(12) Preferably, in the inquiry system 100 described in (11), the region is a country.

In this way, the user of the user side terminal 4 can easily select the installation site.

(13) Preferably, in the inquiry system 100 described in (9), the selection unit 11a displays an input field for making the user side terminal 4 input a zip code or an address of the installation site of the machine and/or the device so as to make the user side terminal 4 input the zip code or the address.

In this way, the user of the user side terminal 4 can easily specify the installation site.

(14) Preferably, in the inquiry system 100 described in any one of (1) to (13), the relay device 1B further includes a proposal unit 13 which monitors details of the inquiry from the user side terminal 4 and which proposes, when an answer is present on a database, the answer for the user side terminal 4 before notification to the inquiry center system C.

In this way, the relay device 1B can rapidly solve the problem which occurs in the end user site.

(15) Preferably, in the inquiry system 100 described in (14), the communication unit 30 notifies the answer proposed by the proposal unit 13 to the selected inquiry center system C.

In this way, the inquiry center system C of the supplier can check whether or not the answer received from the relay device 1B is correct, and thereby can more accurately answer to the inquiry from the user side terminal 4 in the end user site.

(16) Preferably, in the inquiry system 100 described in (14) or (15), the user side terminal 4 includes a display unit 50 which displays the answer proposed by the proposal unit 13.

In this way, it is possible to rapidly solve the problem which occurs in the end user site.

(17) Preferably, in the inquiry system 100 described in any one of (14) to (16), the proposal unit 13 monitors the details of the inquiry, acquires, when determining that machine data indicating a state of the machine and/or the device is needed, the machine data automatically or by an operation of the user side terminal 4, and provides the acquired machine data to the selected inquiry center system C.

In this way, it is possible to rapidly solve the problem which occurs in the end user site.

(18) Preferably, in the inquiry system 100 described in any one of (14) to (17), the proposal unit 13 monitors the details of the inquiry, and proposes, when determining that the inquiry center system C needs to be changed, a new inquiry center system C for either or both of the user side terminal 4 and the selected inquiry center system C.

In this way, it is possible to select a more appropriate inquiry center system C of the supplier, and thus it is possible to rapidly solve the problem which occurs in the end user site.

(19) A relay device 1 of the present disclosure is a relay device which relays inquiries related to a machine and/or a device made by an inquiry unit that is a terminal device (user side terminal 4) of a user of the machine and/or the device to a plurality of inquiry center systems C of suppliers including a maker of the machine and/or the device, and includes: a communication unit 30 which communicates between the user side terminal 4 and the inquiry center systems C; and a selection unit 11 which selects the inquiry center system C based on first identification information related to the machine and/or the device and second identification information related to the machine and/or the device that are stored in a storage unit 20 and the communication unit 30 connects together the user side terminal 4 and the inquiry center system C selected by the selection unit 11.

In the relay device 1, it is possible to select the inquiry center system C which provides an appropriate answer even when the user in the end user site does not have advanced expertise.

(20) Preferably, the relay device 1 described in (19) includes: a determination unit 12 which determines, when the communication unit 30 receives machine information on the machine and/or the device from the user side terminal 4, whether or not the machine information needs to be stored in the storage unit 20, and the determination unit 12 stores, in the storage unit 20, the machine information which is determined to need to be stored.

In this way, it is possible to acquire the latest machine information of the machine and/or the device in the end user site so as to be able to prevent a duplicate registration.

(21) Preferably, in the relay device 1 described in (20), the determination unit 12 notifies the received machine information to the selected inquiry center system C.

In this way, even in the selected inquiry center system C of the supplier, it is possible to acquire the latest information of the device and/or the device in the end user site.

(22) Preferably, in the relay device 1 described in (20), the determination unit 12 notifies the machine information determined by the determination unit 12 to need to be stored to the selected inquiry center system C.

In this way, even in the selected inquiry center system C of the supplier, it is possible to acquire the latest and different machine information of the device and/or the device in the end user site.

(23) Preferably, in the relay device 1 described in any one of (19) to (22), the first identification information includes either of individual identification information of the machine and/or the device and model information of the machine and/or the device.

In this way, only the individual identification information (model information) is acquired from the user side terminal 4, and thus it is possible to select the inquiry center system C of the supplier which provides an appropriate answer.

(24) Preferably, in the relay device 1 described in any one of (19) to (23), the second identification information includes any one of an inquiry history, a repair history of the machine and/or the device, an installation site of the machine and/or the device, part information of the machine and/or the device, version information of software of the machine and/or the device, setting information of the machine and/or the device, alarm information generated in the machine and/or the device, user information of the machine and/or the device, manufacturer information of the machine and/or the device, and sales maker information of the machine and/or the device.

In this way, the inquiry center system C of the supplier which provides an appropriate an answer can be selected with high accuracy.

(25) Preferably, in the relay device 1A described in any one of (19) to (24), the communication unit 30 receives the first identification information and position information of the user side terminal 4, and the selection unit 11a selects the inquiry center system C based on the first identification information, the second identification information, and the position information of the user side terminal 4.

In this way, it is possible to select the nearest inquiry center system C of the supplier in which the arrangement of a maintenance person or the like is easy.

(26) Preferably, in the relay device 1A described in (25), at least when the installation site of the machine and/or the device based on the first identification information and the second identification information is different from the position information of the user side terminal 4, the selection unit 11a makes the user side terminal 4 select the installation site of the machine and/or the device.

In this way, even when the installation site of the machine and/or the device associated with the individual identification information and based on the information on the database is different from the position information of the user side terminal 4, it is possible to select the nearest inquiry center system C of the supplier in which the arrangement of a maintenance person or the like is easy.

(27) Preferably, in the relay device 1A described in (26), the selection unit 11a displays, as a list, for the user side terminal 4, the installation site of the machine and/or the device based on the first identification information and the second identification information and the position information of the user side terminal 4 so as to make the user side terminal 4 make a selection.

In this way, the user of the user side terminal 4 can easily select the installation site.

(28) Preferably, in the relay device 1A described in (26), the selection unit 11a displays, as a map, for the user side terminal 4, the installation site of the machine and/or the device based on the first identification information and the second identification information and the position information of the user side terminal 4 so as to make the user side terminal 4 select a region.

In this way, the user of the user side terminal 4 can easily select the installation site.

(29) Preferably, in the relay device 1A described in (28), the region is a country.

In this way, the user of the user side terminal 4 can easily select the installation site.

(30) Preferably, in the relay device 1A described in (26), the selection unit 11a displays an input field for making the user side terminal 4 input a zip code or an address of the installation site of the machine and/or the device so as to make the user side terminal 4 input the zip code or the address.

In this way, the user of the user side terminal 4 can easily specify the installation site.

(31) Preferably, the relay device 1B described in any one of (19) to (30) includes: a proposal unit 13 which monitors details of the inquiry from the user side terminal 4 and which proposes, when an answer is present on a database, the answer for the user side terminal 4 before notification to the inquiry center system C.

In this way, it is possible to rapidly solve the problem which occurs in the end user site.

(32) Preferably, in the relay device 1B described in (31), the proposal unit 13 monitors the details of the inquiry, acquires, when determining that machine data indicating a state of the machine and/or the device is needed, the machine data automatically or by an operation of the user side terminal 4, and provides the acquired machine data to the selected inquiry center system C.

In this way, it is possible to rapidly solve the problem which occurs in the end user site.

(33) Preferably, in the relay device 1B described in (31) or (22), the proposal unit 13 monitors the details of the inquiry, and proposes, when determining that the inquiry center system needs to be changed, a new inquiry center system C for either or both of the user side terminal 4 and the selected inquiry center system C.

In this way, it is possible to select a more appropriate inquiry center system C of the supplier, and thus it is possible to rapidly solve the problem which occurs in the end user site.

EXPLANATION OF REFERENCE NUMERALS

1, 1A, 1B relay device
4 user side terminal
8(1)-8(n) terminal device
10, 10a, 10b control unit
11, 11a selection unit
12 determination unit
13 proposal unit
20 storage unit
30 communication unit
C(1) to C(n) inquiry center system

What is claimed is:

1. An inquiry system in which an inquiry unit that is a terminal device of a user of at least a machine tool or an industrial robot makes inquiries related to at least the machine tool or the industrial robot to a plurality of inquiry center systems of suppliers including a supplier of at least the machine tool or the industrial robot, the inquiry system comprising:
   a relay device which connects together the inquiry unit and the plurality of inquiry center systems; and
   a storage unit which stores first identification information related to at least the machine tool or the industrial robot and second identification information including at least an inquiry history related to at least the machine tool or the industrial robot,
   wherein the inquiry unit includes:
   an acquisition unit which acquires the first identification information attached to at least the machine tool or the industrial robot; and
   a first communication unit which transmits the first identification information acquired by the acquisition unit to the relay device, the relay device includes:
  a second communication unit which communicates between the inquiry unit and the plurality of inquiry center systems; and
  a selection unit which selects, based on the first identification information received and the second identification information stored in storage unit, an inquiry center system among the plurality of inquiry center systems, and
  the second communication unit connects together the inquiry unit and the inquiry center system selected by the selection unit.

2. The inquiry system according to claim 1, wherein the acquisition unit acquires machine information of at least the machine tool or the industrial robot,
  the relay device includes a determination unit which determines whether the machine information needs to be stored in the storage unit and
  the determination unit stores, in the storage unit, the machine information which is determined to need to be stored.

3. The inquiry system according to claim 2, wherein the determination unit notifies the machine information acquired by the acquisition unit to the selected inquiry center system.

4. The inquiry system according to claim 2, wherein the determination unit notifies the machine information determined by the determination unit to need to be stored to the selected inquiry center system.

5. The inquiry system according to claim 2, wherein the machine information acquired by the acquisition unit includes the second identification information.

6. The inquiry system according to claim 1, wherein the first identification information includes either of individual identification information of at least the machine tool or the industrial robot and model information of at least the machine tool or the industrial robot.

7. The inquiry system according to claim 1, wherein the second identification information includes any one of an inquiry history, a repair history of at least the machine tool or the industrial robot, an installation site of at least the machine tool or the industrial robot, part information of at least the machine tool or the industrial robot, version information of software of at least the machine tool or the industrial robot, setting information of at least the machine tool or the industrial robot, alarm information generated in at least the machine tool or the industrial robot, user information of at least the machine tool or the industrial robot, manufacturer information of at least the machine tool or the industrial robot, and sales supplier information of at least the machine tool or the industrial robot.

8. The inquiry system according to claim 1, wherein the second communication unit receives the first identification information and position information of the inquiry unit, and
  the selection unit selects the inquiry center system based on the first identification information, the second identification information, and the position information of the inquiry unit.

9. The inquiry system according to claim 8, wherein at least when the installation site of at least the machine tool or the industrial robot based on the first identification information and the second identification information is different from the position information of the inquiry unit, the selection unit makes the inquiry unit select the installation site of at least the machine tool or the industrial robot.

10. The inquiry system according to claim 9, wherein the selection unit displays, as a list, for the inquiry unit, the installation site of at least the machine tool or the industrial robot based on the first identification information and the second identification information and the position information of the inquiry unit so as to make the inquiry unit make a selection.

11. The inquiry system according to claim 9, wherein the selection unit displays, as a map, for the inquiry unit, the installation site of at least the machine tool or the industrial robot based on the first identification information and the second identification information and the position information of the inquiry unit so as to make the inquiry unit select a region.

12. The inquiry system according to claim 11, wherein the region is a country.

13. The inquiry system according to claim 9, wherein the selection unit displays an input field for making the inquiry unit input a zip code or an address of the installation site of at least the machine tool or the industrial robot so as to make the inquiry unit input the zip code or the address.

14. The inquiry system according to claim 1, wherein the relay device further includes a proposal unit which monitors details of the inquiry from the inquiry unit and which proposes, when an answer is present on a database, the answer for the inquiry unit before notification to the inquiry center system.

15. The inquiry system according to claim 14, wherein the second communication unit notifies the answer proposed by the proposal unit to the selected inquiry center system.

16. The inquiry system according to claim 14, wherein the inquiry unit includes a display unit which displays the answer proposed by the proposal unit.

17. The inquiry system according to claim 14, wherein the proposal unit monitors the details of the inquiry, acquires, when determining that machine data indicating a state of at least the machine tool or the industrial robot is needed, the machine data automatically or by an operation of the inquiry unit, and provides the acquired machine data to the selected inquiry center system.

18. The inquiry system according to claim 14, wherein the proposal unit monitors the details of the inquiry, and proposes, when determining that the inquiry center system needs to be changed, a new inquiry center system for either or both of the inquiry unit and the selected inquiry center system.

19. A relay device which relays inquiries related to an industrial machine or an industrial device made by an inquiry unit that is a terminal device of a user of at least a machine tool or an industrial robot to inquiry a plurality of inquiry center systems of suppliers including a supplier of at least the machine tool or the industrial robot, the relay device comprising:
  a communication unit which communicates between the inquiry unit and the inquiry center systems; and
  a selection unit which selects an inquiry center system among the plurality of inquiry center systems based on first identification information attached to at least the machine tool or the industrial robot and second identification information including at least an inquiry history related to at least the machine tool or the industrial robot stored in a storage unit,
  wherein the communication unit connects together the inquiry unit and the inquiry center system selected by the selection unit.

20. The relay device according to claim 19, comprising:
a determination unit which determines, when the communication unit receives machine information on at least the machine tool or the industrial robot from the inquiry unit, whether or not the machine information needs to be stored in the storage unit, wherein the determination unit stores, in the storage unit, the machine information which is determined to need to be stored.

21. The relay device according to claim 20, wherein the determination unit notifies the received machine information to the selected inquiry center system.

22. The relay device according to claim 20, wherein the determination unit notifies the machine information determined by the determination unit to need to be stored to the selected inquiry center system.

23. The relay device according to claim 19, wherein the first identification information includes either of individual identification information of at least the machine tool or the industrial robot and model information of at least the machine tool or the industrial robot.

24. The relay device according to claim 19, wherein the second identification information includes any one of an inquiry history, a repair history of at least the machine tool or the industrial robot, an installation site of at least the machine tool or the industrial robot, part information of at least the machine tool or the industrial robot, version information of software of at least the machine tool or the industrial robot, setting information of at least the machine tool or the industrial robot, alarm information generated in at least the machine tool or the industrial robot, user information of at least the machine tool or the industrial robot, manufacturer information of at least the machine tool or the industrial robot, and sales supplier information of at least the machine tool or the industrial robot.

25. The relay device according to claim 19, wherein the communication unit receives the first identification information and position information of the inquiry unit, and the selection unit selects the inquiry center system based on the first identification information, the second identification information, and the position information of the inquiry unit.

26. The relay device according to claim 25, wherein at least when the installation site of at least the machine tool or the industrial robot based on the first identification information and the second identification information is different from the position information of the inquiry unit, the selection unit makes the inquiry unit select the installation site of at least the machine tool or the industrial robot.

27. The relay device according to claim 26, wherein the selection unit displays, as a list, for the inquiry unit, the installation site of at least the machine tool or the industrial robot based on the first identification information and the second identification information and the position information of the inquiry unit so as to make the inquiry unit make a selection.

28. The relay device according to claim 26, wherein the selection unit displays, as a map, for the inquiry unit, the installation site of at least the machine tool or the industrial robot based on the first identification information and the second identification information and the position information of the inquiry unit so as to make the inquiry unit select a region.

29. The relay device according to claim 28, wherein the region is a country.

30. The relay device according to claim 26, wherein the selection unit displays an input field for making the inquiry unit input a zip code or an address of the installation site of at least the machine tool or the industrial robot so as to make the inquiry unit input the zip code or the address.

31. The relay device according to claim 19, comprising: a proposal unit which monitors details of the inquiry from the inquiry unit and which proposes, when an answer is present on a database, the answer for the inquiry unit before notification to the inquiry center system.

32. The relay device according to claim 31, wherein the proposal unit monitors the details of the inquiry, acquires, when determining that machine data indicating a state of at least the machine tool or the industrial robot is needed, the machine data automatically or by an operation of the inquiry unit, and provides the acquired machine data to the selected inquiry center system.

33. The relay device according to claim 31, wherein the proposal unit monitors the details of the inquiry, and proposes, when determining that the inquiry center system needs to be changed, a new inquiry center system for either or both of the inquiry unit and the selected inquiry center system.

* * * * *